(12) United States Patent
Abe et al.

(10) Patent No.: US 7,359,374 B2
(45) Date of Patent: Apr. 15, 2008

(54) RELAY DEVICE AND METHOD

(75) Inventors: Hideo Abe, Yokohama (JP); Kenji Fukuda, Yokohama (JP); Susumu Kojima, Yokohama (JP); Kazunori Suzuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 11/174,836

(22) Filed: Jul. 5, 2005

(65) Prior Publication Data
US 2006/0209793 A1 Sep. 21, 2006

(30) Foreign Application Priority Data
Mar. 18, 2005 (JP) ............................. 2005-079630

(51) Int. Cl.
*H04M 1/00* (2006.01)
*H04M 3/00* (2006.01)
(52) U.S. Cl. .................... 370/352; 370/302; 370/360; 370/401; 370/402
(58) Field of Classification Search ........ 370/352–358, 370/360, 362, 401–402, 302
See application file for complete search history.

(56) References Cited
U.S. PATENT DOCUMENTS
2001/0021186 A1* 9/2001 Ono et al. ................. 370/352
2002/0145999 A1* 10/2002 Dzik ......................... 370/352
2003/0002476 A1* 1/2003 Chung et al. .............. 370/352
2003/0086412 A1* 5/2003 Jeong et al. ................ 370/352
2005/0157708 A1* 7/2005 Chun ......................... 370/356
2005/0180407 A1* 8/2005 Kim .......................... 370/356
2005/0254482 A1* 11/2005 Yeom ........................ 370/352

FOREIGN PATENT DOCUMENTS
JP 4-239254 8/1992
JP 2002-209025 7/2000

* cited by examiner

*Primary Examiner*—Matthew Anderson
*Assistant Examiner*—Tuan Pham
(74) *Attorney, Agent, or Firm*—Katten Muchin Rosenman LLP

(57) ABSTRACT

The present invention relates to a relay device enabling efficient management of a voice message and a caller to wait for transmission of the voice message in a short time. The relay device is located at a boundary between an existing telephone network and an IP network, converts and relays a voice signal and an IP packet. The relay device comprises a receiving unit receiving voice source data into which a voice message is digitized, a packet processing unit converting the received voice source data into a voice source data packet as the IP packet, a storage unit storing the converted voice source data packets, and a transmitting unit transmitting, when transmitting a designated voice message to a designated destination, the voice source data packet corresponding to the designated voice message among the stored voice source data packets.

4 Claims, 21 Drawing Sheets

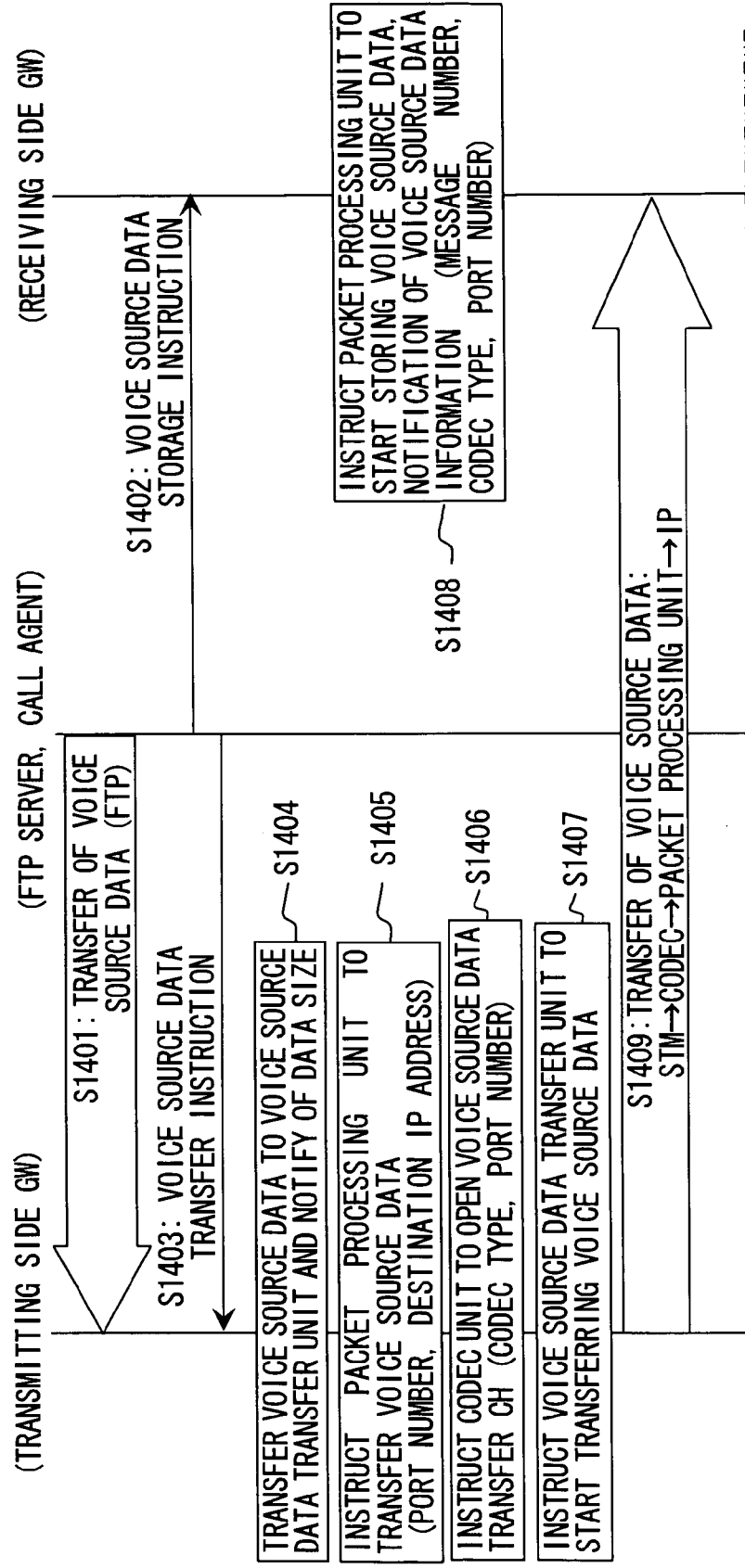

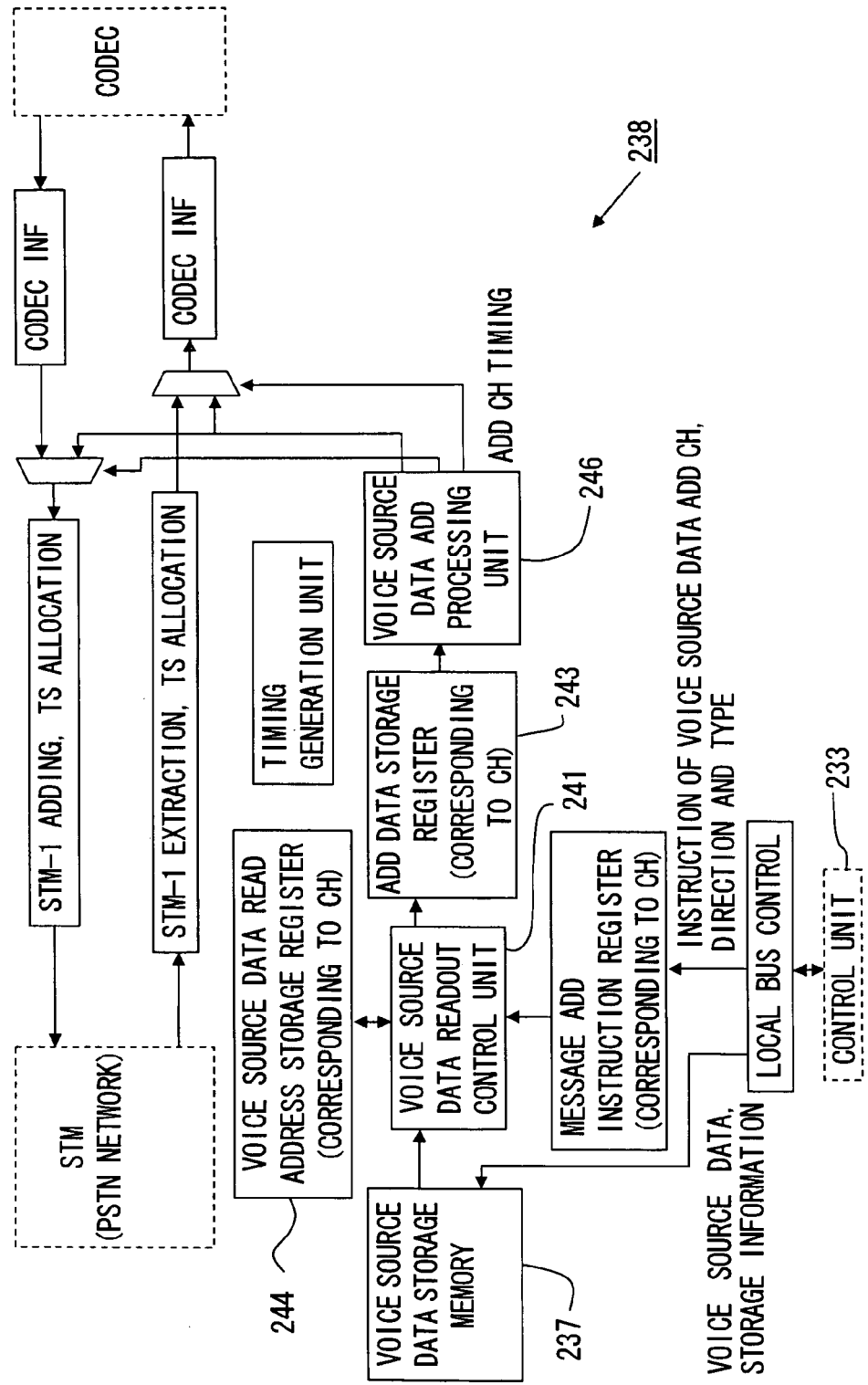

RELAY DEVICE AND METHOD

BACKGROUND OF THE INVENTION

1. Field of the Invention

The invention relates a relay device for relaying data in a way that mutually converts voice signals and IP packets between an existing telephone network and an IP (Internet Protocol) network.

2. Description of the Related Art

At the present, utilization of a technology for performing a voice talk is underway, wherein the existing Public Switched Telephone Networks (which will hereinafter be abbreviated to PSTNs) are connected to each other via an IP (Internet Protocol) network. This type of technology involves employing VOIP (Voice Over Internet Protocol) etc. for transferring and receiving the voice signals over the IP network.

This type of VOIP-based conventional voice talk system (which will hereinafter be referred to as a conventional system) will be explained with reference to FIG. 17. FIG. 17 is a view showing an example of a network architecture of the conventional telephone system. In the conventional system shown in FIG. 17, a VOIP gateway (which will hereinafter be abbreviated to VOIPGW) located at a boundary between the PSTN and the IP network voice-packetizes digital signals (STM (synchronous Transport Module)-1, STM-4, etc.) transferred and received over the PSTN by use of a self-equipped CODEC (Coder/Decoder) etc. and forwards the voice packets to the IP network, thereby actualizing voice communications.

The conventional system is that, as illustrated in FIG. 17, telephones 215 as subscriber terminals connected to a PSTN 211 are connected to telephones 216, etc. connected to another PSTN 212 via an IP network 210. Further, the PSTNs 211 and 212 are connected to the IP network 210 via VOIP gateways 213 and 214, respectively. Moreover, a call agent (which will hereinafter abbreviated to CA) is connected to the IP network 210, wherein this CA controls calls from the respective telephones 215 and 216. Further, an FTP (File Transfer Protocol) server 218 is connected to the IP network 210. The FTP server 218 retains digital data (which will hereinafter be referred to as voice source data) etc. into which a guidance message of a talkie etc. is voice-coded by utilizing a μ-LAW 64 kbs PCM (Pulse Coded Modulation (ITU-T G.711) system and so on.

Next, an operation of the conventional system on the occasion of providing a service for flowing the guidance message of the talkie etc. to the telephone as the subscriber terminal, will be explained with reference to FIGS. 17 and 18. FIG. 17 is a view showing a network architecture of the conventional system and also illustrating how the voice source data are transferred from the FTP server. FIG. 18 is a view showing how the voice source data are sent to the PSTN from the VOIPGW in response to an instruction of the CA in the conventional system shown in FIG. 17.

To start with, as preprocessing, the FTP server 218 transfers, as shown in FIG. 17, the voice source data to the VOIP gateways 213 and 214 (S219). Then, the VOIP gateways 213 and 214 receiving the voice source data store memories with the voice source data. Namely, the voice source data related to the message of the talkie etc. are stored on the respective VOIP gateways.

Next, the operation of the conventional system for actually flowing the message to each telephone, will be described. The conventional system sends the message in response to a call from the telephone as the user terminal. In this case, the CA notifies each VOIPGW of call control information such as call setting, a voice source data add instruction, etc. (S221). The VOIPGW notified of the call control information adds the voice source data to a designated timeslot in the STM, thereby sending the voice source data to a target telephone (S222).

An operation of the VOIPGW stored with voice source data and sending the stored voice source data to the target telephone, will be described with reference to FIG. 19. FIG. 19 is a diagram showing a configuration of the VOIPGW in the conventional system and also illustrating how the VOIPGW is stored with the voice source data and sends the voice source data. Note that FIG. 19 shows a functional configuration by exemplifying the VOIPGW 213.

The VOIPGW 213 is constructed of an IP switch unit 231 serving as an interface with the IP network, an STM switch control unit 232 serving as an interface with the PSTN, a control unit 233, a CODEC unit 234, a packet processing unit 235 and a packet buffer 236. The STM switch control unit 232 is further constructed of a voice source data storage memory 237, a voice source data add unit 238, etc.

In the case of storing the voice source data given from the FTP server 218, the VOIPGW 213 receives the voice source data from the IP network 210 and stores the voice source data on the voice source data storage memory 237 within the STM switch control unit 232 via the IP switch unit 231, the packet processing unit 235 and the control unit 233 (a data flow indicated by a dotted line in FIG. 19).

On the other hand, in the case of sending the voice source data to the telephone, the VOIPGW 213 receives a call control signal from the CA. The VOIP gateway 213 receiving the call control signal from the CA instructs the packet processing unit 235, the CODEC unit 234 and the STM switch control unit 232 to perform call setting in accordance with the call control signal (a data flow indicated by one-dotted broken line in FIG. 19). Next, the VOIPGW 213 receives a voice source data add instruction from the CA. Upon receiving the instruction, the control unit 233 instructs the voice source data add unit 238 to send (add) the voice source data into a channel (call) designated in the voice source data add unit 238 (a data flow indicated by a solid line in FIG. 19).

An operation of the voice source data add unit 238 will be explained in greater detail with reference to FIG. 20. FIG. 20 is a diagram showing a detailed functional configuration of the voice source data add unit 238 in the conventional VOIPGW. The voice source data add unit 238 adds, based on the voice source data add instruction given from the control unit 233, the designated voice source data into the designated channel. Further, respective functional units of the voice source data add unit 238, as one frame is transmitted and received at an interval of 125 micro second (μs) when the PSTN employs the STM-1 communication system, execute the following processes within this interval.

A voice source data readout control unit 241, in accordance with the voice source data add instruction given from the control unit 233, on a channel-by-channel basis, calculates a readout address, reads the voice source data from the voice source data storage memory 237, retains the readout data on an add data storage register 234 (channel unit), and updates and retains the readout address on a voice source data readout address storage register 244 (channel unit). Moreover, a voice source data add processing unit 246 reads the add data from the add data storage register 243 and adds the add data in synchronization with a channel-by-channel transmission timing.

As described above, in the conventional system, the voice source data transmitted by the FTP server 218 are stored on the voice source data storage memory 237 of the VOIP gateway 213. Then, in the case of sending the voice source data in accordance with the call given from the subscriber terminal, the VOIP gateway 213 reads the voice source data on the channel-by-channel basis (the channel unit) from the voice source data storage memory 237, and the voice source data add processing unit 246 adds (allocates) the voice source data to a predetermined timeslot of the STM.

Note that the conventional art related to the present invention of the application is disclosed in the following document. The conventional art document is "Japanese Patent Application Laid-Open Publication No.4-239254".

The voice source data storage/transmission method in the conventional system, however, has the following problems.

First, in the conventional system, the storage of the voice source data involves preparing a dedicated memory such as a ROM (Read Only Memory) etc. in the STM switch control unit 232 within the VOIPGW in order to store the voice source data. The STM switch control unit 232 is normally mounted with only a small-capacity memory. Therefore, it is required that a memory for storing the voice source data be provided for this purpose. A flash ROM suited to accessing on a 1-byte basis is in many cases employed for this dedicated memory. This is because in the case of adding the data into a timeslot corresponding to each channel, the data are required to be added on the 1-byte basis in terms of STM communications standards. Further, in the case of having a necessity of storing plural categories of voice source data, even when using a large-capacity flash ROM, a plurality of memories are needed. For example, the flash ROM having an 8-megabyte (MB) capacity is stored with only the voice source data on the order of 16 min as a total.

Second, on the occasion of adding the voice source data into the STM timeslot, there can be no perfect assurance for searching out the head of the voice message, corresponding to a call of every subscriber terminal. This is derived from the following reasons. In the case of adding the voice source data into the STM timeslot, it is required that the voice source data be separately readout for every channel corresponding to the call. If the number of channels which should be added at a time increases, there must be a rise in data size of the data to be read out within a predetermined frame interval (e.g., 125 μs at 64 Kbps), and hence the memory access speed does not catch up with this rise.

Concerning this problem, there is proposed a method that the voice source data are previously read out at a certain fixed interval in order to search out the head of the voice message, and the closest readout data is selected and added into the target timeslot (refer to "Japanese Patent Application Laid-Open Publication No.4-239254"). In this method also, however, if there are plural categories of voice messages, it follows that a limit of a voice source data readout interval is determined from the memory access time, and hence there is no perfect head-search-out function. For instance, in the case of the voice source data on the order of 16 min as a total, supposing that the access time to the flash ROM is 90 nanoseconds (ns), the readout interval is equal to or larger than approximately 700 milliseconds (ms). In the case of the voice source data on the order of 32 min as a total, the readout interval is equal to or larger than approximately 1.4 sec.

Third, the memory management of the memory (the voice source data storage memory 237) for storing the voice source data of the voice message becomes troublesome. The conventional system, in the case of storing the voice source data corresponding to the voice message, requires ensuring a memory area for a maximum length of the voice source data that should be stored previously. Further, the voice source data, if not stored in one area, are divided into equal data segments and thus stored. Under such a condition, when changing the voice message, especially when changing into a voice message having a different message length, it is required that the memory area already stored with the voice source data be released and that the segmented memories be reallocated to the voice source data for the change.

SUMMARY OF THE INVENTION

It is an object of the present invention to actualize a relay device enabling efficient management of a voice message and a caller to wait for transmission of the voice message in a short time in the relay device that converts a voice signal between an existing public switched telephone network and an IP network.

The invention adopts the following configurations in order to solve the problems. Namely, the present invention is a relay device located at a boundary between an existing telephone network and an IP network and relaying a voice signal and an IP packet in a way that mutually converts the voice signal transferred and received over the existing telephone network and the IP packet transferred and received over the IP network, which the relay device comprises a receiving unit receiving voice source data into which a voice message is digitized, a packet processing unit converting the received voice source data into a voice source data packet as the IP packet, a storage unit storing the converted voice source data packets, and a transmitting unit transmitting, when transmitting a designated voice message to a designated destination, the voice source data packet corresponding to the designated voice message among the stored voice source data packets to the designated destination.

In the present invention, the voice source data packets, which convert the voice source data corresponding to the voice message into IP packets, are retained, and the voice source data packet corresponding to the designated voice message among the retained voice source data packets are transmitted.

Accordingly, the relay device according to the present invention handles the IP packets when transmitting the voice message and is therefore capable of high-speed processing as compared with the conventional system handling the voice source data themselves in conformity with a communication mode over the existing telephone network. Owing to this, it is possible to increase the number of simultaneously-transmittable destinations and to transmit the voice message without the caller's waiting in a long time.

Further, the relay device according to the present invention further comprises a transfer unit transmitting, toward the IP network, the voice source data packet converted by the packet processing unit so that the packet is addressed to other relay device. Moreover, the relay device of the present invention further comprises a packet receiving unit receiving the voice source data packet transmitted from the other relay device, and a packet storage unit storing the received voice source data packets.

In the present invention, the voice source data are packetized, and the voice source data packet is transferred to other relay device. On the other hand, in the case of receiving the voice source data packet transferred from the other relay device, the received voice source data packet is stored direly on the self storage unit.

Therefore, according to the present invention, it is possible to limit the number of the relay devices each having the function of packetizing the voice source data and to build up a system that restrains the cost in the system employing the relay device according to the present invention.

Further, the relay device further comprises a data transmitting unit transmitting, toward the IP network, the voice source data packet stored on the storage unit not as a voice packet but as a data packet so that the packet is addressed to the other relay device. Moreover, the relay device further comprises a data receiving unit receiving the data packet transmitted from the other relay device, wherein the voice source data packet in the data packet received by the data receiving unit is stored.

In the present invention, the voice source data packet retained by the relay device according to the present invention is transferred as a normal data packet to the other relay device. Then, the other relay device receiving the transferred data packet retains the self storage unit with the voice source data packet in the data packet.

Hence, according to the present invention, the voice source data can be handled and transferred in the same way as the normal data can be without transmitting the data with a predetermined period etc. as in the case of the voice packet. This makes it possible to copy the voice source data held by one relay device to the plurality of relay devices by a simple method.

Note that the present invention may be a program for actualizing any one of the functions given above. Further, the present invention may also be a readable-by-computer stored with such a program.

According to the present invention, it is possible to actualize the relay device enabling the efficient management of the voice message and the caller to wait for transmission of the voice message in the short time in the relay device that converts the voice signal between the existing public switched telephone network and the IP network.

BRIEF DESCRIPTION OF THE DRAWINGS

FIGS. 14A and 14B are diagrams showing a diagram showing an other-device transfer sequence in the second embodiment;

FIG. 20 is a diagram showing a detailed functional configuration of a voice source data adding unit in the conventional system;

DESCRIPTION OF THE PREFERRED EMBODIMENTS

First Embodiment

A VOIP (Voice Over Internet Protocol) gateway device (which will hereinafter be abbreviated to VOIPGW) according to a first embodiment of the present invention, will be described with reference to the drawings. A configuration of the first embodiment is an exemplification, and the present invention is not limited to the configuration of the first embodiment.

Network Architecture

Figure 1:
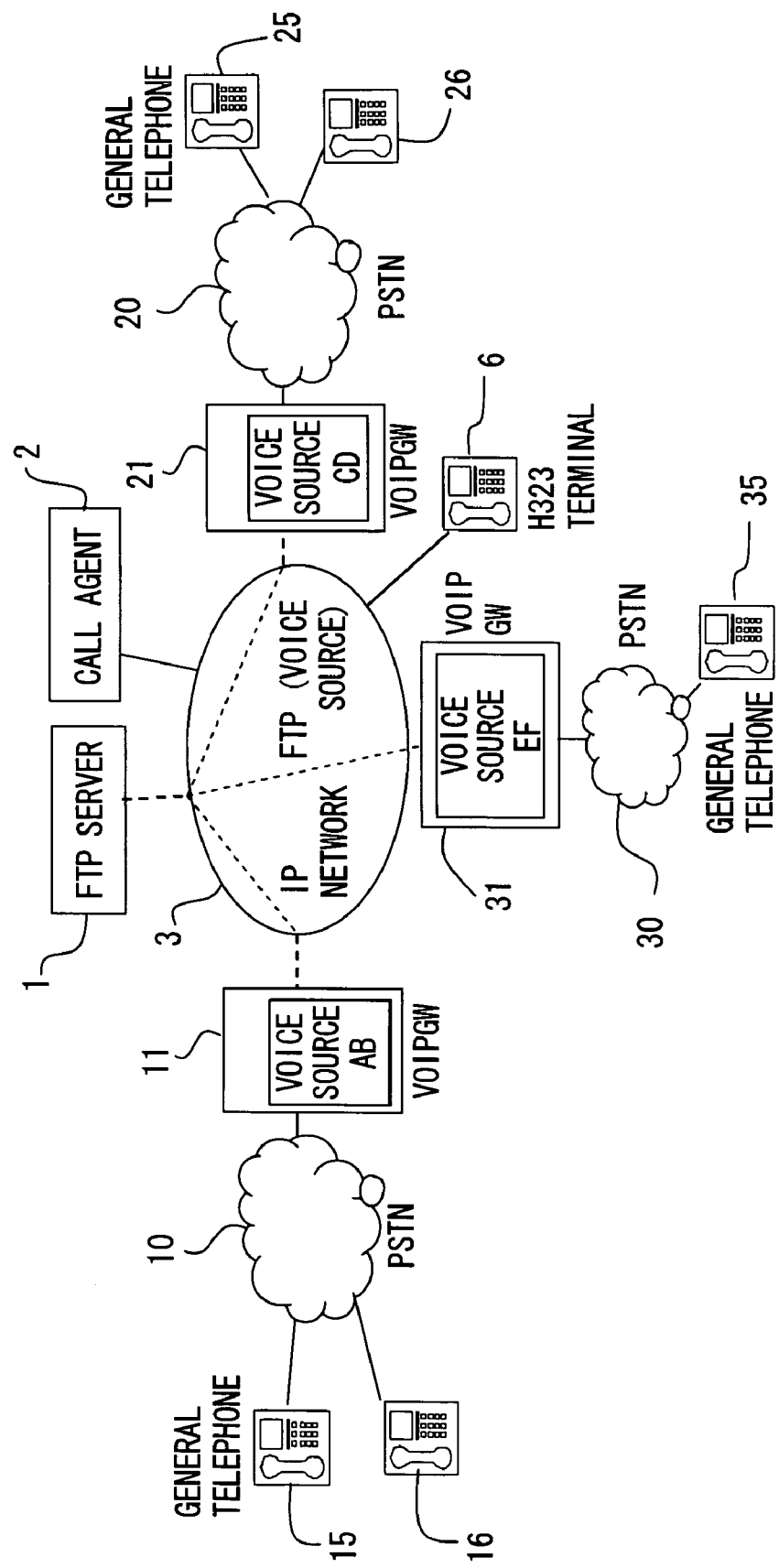
FIG. 1 is a diagram showing a network architecture in a first embodiment.

To begin with, a network architecture of a VOIP call system configured by the VOIPGW according to the first embodiment, will be explained referring to FIG. 1. FIG. 1 is a view showing the network architecture of this VOIP call system.

The network in this VOIP call system is configured by public switched telephone networks (which will hereinafter be abbreviated to PSTNs) 10, 20, and 30, and an IP network 3, wherein the PSTNs 10, 20 and 30 are respectively connected to the IP network 3 via VOIPGWs 11, 21 and 31 according to the embodiment. Telephones 15, 16, 25, 26 and 35 serving as subscriber terminals are connected to the PSTNs, wherein the VOIP call system provides a call service to each of these telephones. The respective PSTNs are built up by STM (Synchronous Transport Module), in which the VOIPGWs 11, 21 and 31 voice-packetize digital signals (STM-1, STM-4, etc.) transferred and received over the PSTNs and relay the voice packets toward the IP network 3, thereby actualizing interconnections. Note that the subscriber terminal may be an IP telephone connectable directly to the IP network 3 as in the case of an H323 terminal 6 in FIG. 1. Further, an FTP (File Transfer Protocol) server 1 and a call agent (which will hereinafter be abbreviated to CA) 2 are connected to the IP network 3.

The FTP server 1 retains digital data (which will hereinafter be referred to as voice source data) etc. into which a guidance message of a talkie etc. is voice-coded by utilizing an ITU-T G.711 system (μ-Law 64 kbs PCM (Pulse Coded Modulation) and so on, and provides the voice source data to each VOIPGW. The CA 2 controls a call from the subscriber terminal and makes the IP network 3 function as a relay switched network between the respective PSTNs. Accordingly, the VOIPGWs 11, 21 and 31, the FTP server 1, etc. execute the respective functions based on control instructions given from the CA 2.

Voice Message Service

The VOIP call system has a function of sending the guidance message of the talkie etc. to each telephone as the subscriber terminal. The following is an explanation of an outline of an operation of each device within the VIOP call system on the occasion of providing the voice message service. The following discussion will exemplify a case that the VOIP call system sends the voice message to the telephone 15 in the network architecture shown in FIG. 1.

In the VOIP call system, when providing the voice message service, at first, the voice source data retained on the FTP server 1 are transferred to the VOIPGW 11 in response to an instruction signal from the CA 2. Namely, the CA 2 instructs the FTP server 1 to transfer the voice source data to the VOIPGW 11, and the FTP server 1 transfers the voice source data to the VOIPGW 11 in response to this instruction. The VOIPGW 11 receiving the voice source data retains the transferred voice source data.

When actually providing the voice message service, the VOIP call system controls each device to send a target voice message among pieces of voice source data retained on the VOIPGW 11 in response to a call from the subscriber terminal. To be specific, the CA 2 performs call control in response to the call of the telephone 15 and, as a result of this, notifies the VOIPGW 11 of call control information such as call setting, a voice source data add instruction, etc. The VOIPGW 11 notified of the call control information adds the voice source data into a designated timeslot (a channel corresponding to the call) in the STM from the PSTN 10, thus sending the voice source data to the target telephone 15.

Configuration of Device

Figure 2:
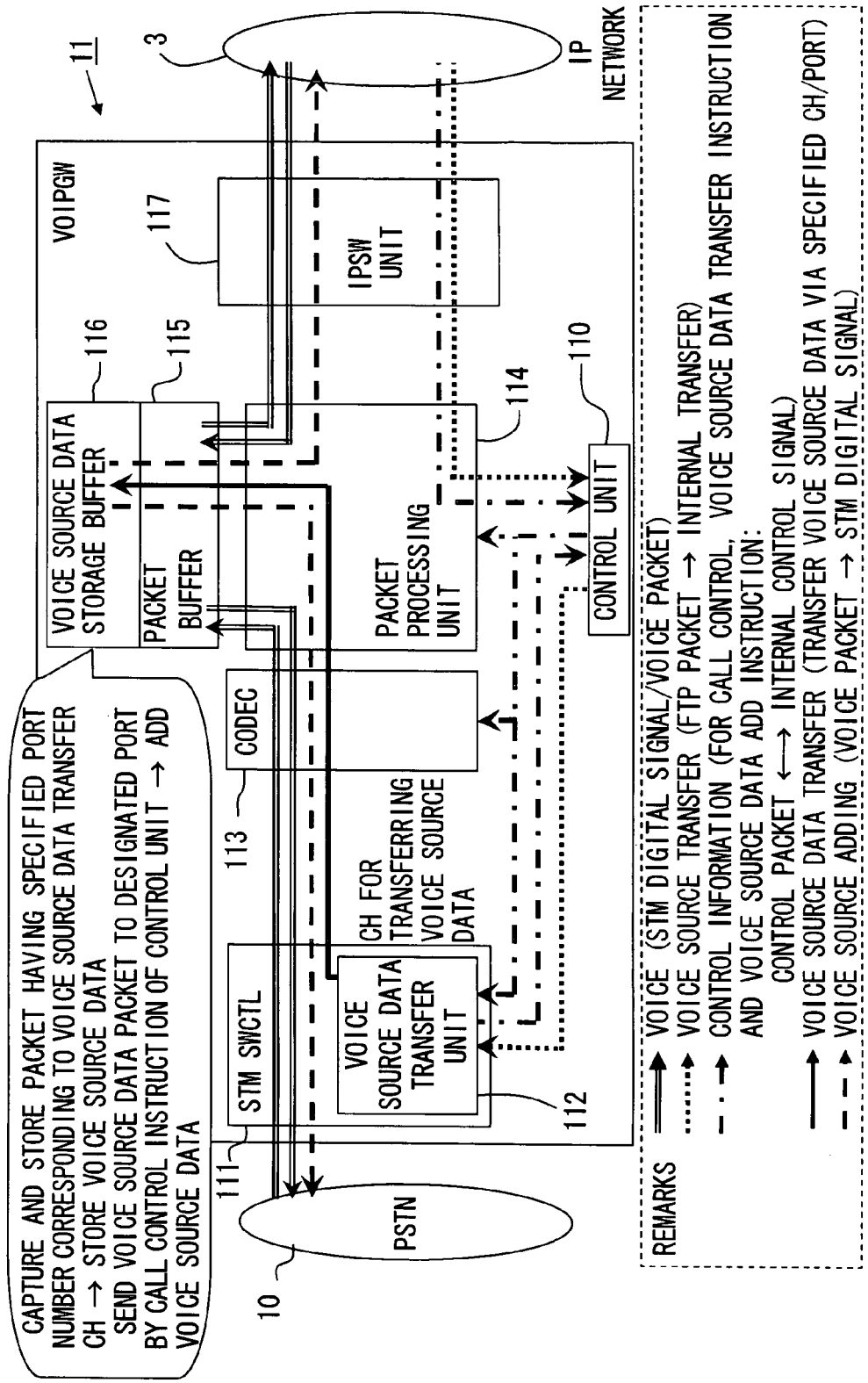
FIG. 2 is a diagram showing a diagram showing a functional configuration of a VOIPGW in the first embodiment.
Figure 3:
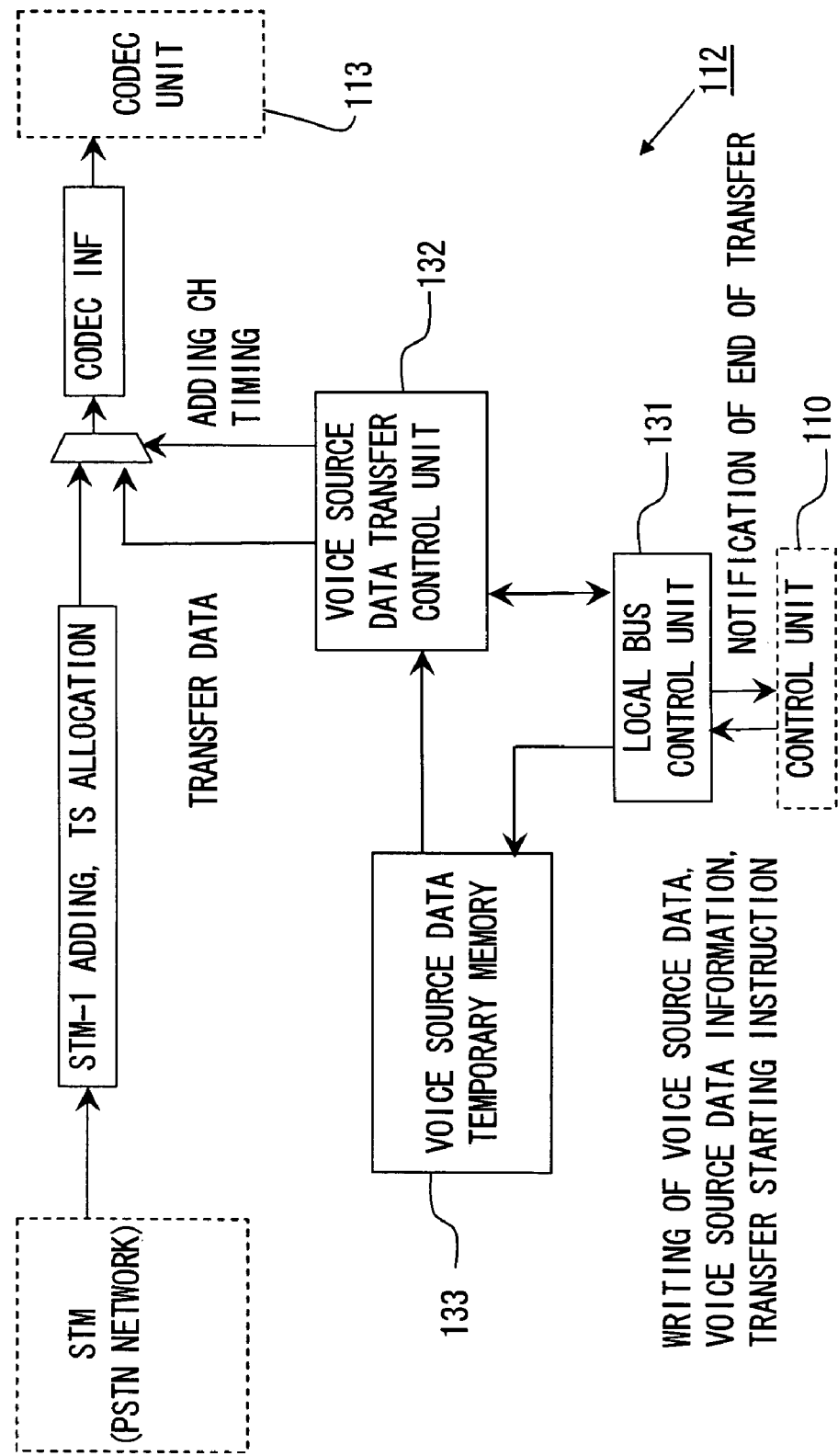
FIG. 3 is a diagram showing a diagram showing a detailed functional configuration of a voice source data transfer unit in the first embodiment.
Figure 4:
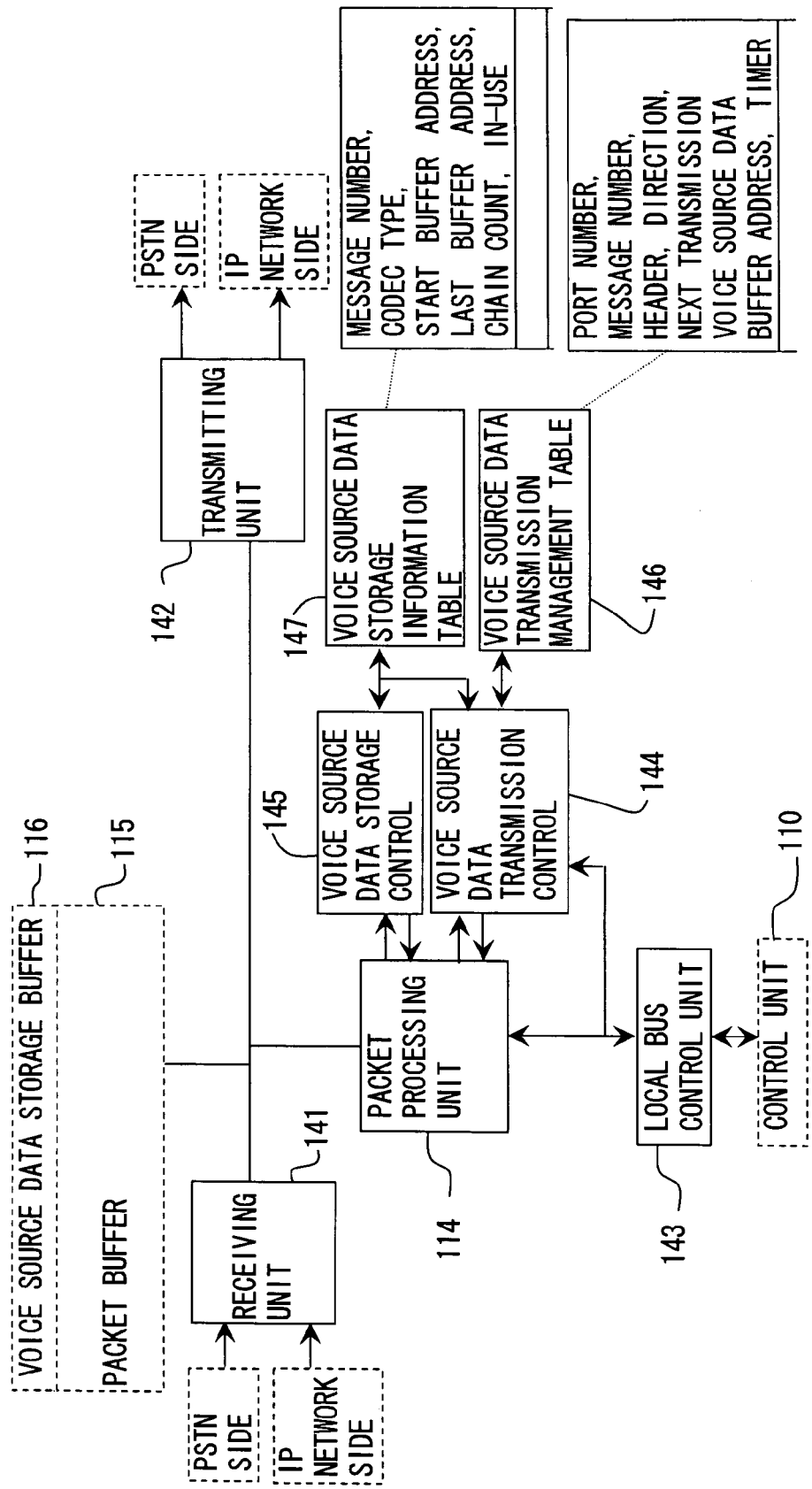
FIG. 4 is a diagram showing a diagram showing a detailed functional configuration of a packet processing unit in the first embodiment.

Next, a functional configuration of the VOIP gateway device according to the first embodiment will be explained with reference to FIGS. 2 through 4. The following discussion will exemplify the VOIPGW 11 shown in FIG. 1. FIG. 2 is a block diagram showing the functional configuration of the VOIPGW 11. FIG. 3 is a block diagram showing a detailed functional configuration of a voice source data transfer unit in the VOIPGW 11. FIG. 4 is a block diagram showing a detailed functional configuration of a packet processing unit in the VOIPGW 11. Note that each of the VOIPGWs 11, 21, and 31 in the first embodiment is the same device and has the same functional configuration.

The VOIPGW in the first embodiment is constructed of, as shown in FIG. 2, a control unit 110, an STM switch control unit 111, a voice source data transfer unit 112, a CODEC unit 113 (corresponding to a packet processing unit, a transmitting unit and a packet transmitting unit according to the present invention), a packet processing unit 114, a packet buffer 115, and an IP switch unit 117 (corresponding to a receiving unit, a packet receiving unit and a data receiving unit according to the present invention). The packet buffer 115 further includes a voice source data storage buffer 116 (corresponding to a storage unit and a packet storage unit according to the present invention). The following are individual descriptions of the respective function units.

Control Unit 110

The control unit 110 receives a call control instruction, a voice source data transfer instruction, a voice source data add instruction, etc. from the CA 2, and transmits instruction signals corresponding these instructions to other respective function units. The control unit 110 extracts a variety of instruction information of the CA 2 from a control packet transmitted from the CA 2. The call control instruction represents a control instruction about the call given from the subscriber terminal within the PSTN 10. This call control instruction contains instructions related to various types of control for establishing a call channel between a self-telephone and a partner telephone in response to the call from the telephone during a period till the call is disconnected since the call was connected.

In the case of receiving the voice source data transferred from the FTP server 1, the control unit 110 transfers the voice source data to the voice source data transfer unit 112 (a dotted line with an arrowhead shown in FIG. 2). Then, the control unit 110 transmits control signals to the voice source data transfer unit 112, the CODEC unit 113 and the packet processing unit 114 so as to transfers the voice source data via the CODEC unit 113 to the packet processing unit 114 and further transfer the voice source data to the voice source data storage buffer 116 (one-dotted chain lines with arrowheads shown in FIG. 2).

STM Switch Control Unit 111

The STM switch control unit 111 takes in an STM line from the PSTN 10 and serves as a PSTN interface. The STM switch control unit 111 executes, based on the call control instruction given from the CA 2, control such as associating a call from the subscriber terminal with the STM channel, and so forth. The STM switch control unit 111 outputs a switch-controlled STM channel to the CODEC unit 113.

Voice Source Data Transfer Unit 112

The voice source data transfer unit 112 temporarily stores the voice source data transferred from the FTP server 1, and transfers the voice source data to the voice source data storage buffer 116 by the instruction of the control unit 110. The voice source data transfer unit 112 transfers the voice source data toward the CODEC unit 113 by using a specified voice source data transfer channel designated by the CA 2 in the STM between the STM switch control unit 111 and the CODEC unit 113.

FIG. 3 is a diagram showing a detailed functional configuration of the voice source data transfer unit 112 of the VOIPGW in the first embodiment. The detailed functional configuration of the voice source data transfer unit 112 will be explained with reference to FIG. 3. The voice source data transfer unit 112 is constructed of a local bus control unit 131, a voice source data transfer control unit 132 and a voice source data temporary memory 133. These function units will be described as below.

Voice Source Data Temporary Memory 133

The voice source data temporary memory 133 is a memory for temporarily storing the voice source data transferred from the FTP server 1.

Local Bus Control Unit 131

The local bus control unit 131, based on the instruction given from the control unit 110, transmits and receives the control signals within the local bus, thereby controlling the voice source data add control unit 131 and the voice source data temporary memory 133. For instance, the voice source data transferred from the FTP server 1 are stored on the voice source data temporary memory 133 in accordance with the control signal given from the local bus control unit 131.

Voice Source Data Transfer Control Unit 132

The voice source data transfer control unit 132 adds the voice source data stored on the voice source data temporary memory 133 onto a specified voice source data transfer channel by the voice source data transfer instruction given from the CA 2 (the control unit 110). The voice source data transfer control unit 132 adds the voice source data in a way that reads the data on a byte-by-byte basis from the voice source data temporary memory 133 for every STM frame (125 µs) sent from the PSTN 10. Further, the voice source data transfer control unit 132, when finishing adding a last piece of voice source data, notifies the local bus control unit 131 of the end of the voice source data transfer. The notification showing the end of the voice source data transfer is delivered eventually to the CA 2.

CODEC Unit 113

The CODEC unit 113 has the voice data subjected to data compression etc. by a predetermined method, thus voice-packetizing the voice data. As a CODEC method, there are standardized methods as defined by ITU-T G.711, ITU-T G.729, etc. The CODEC unit 113 performs encoding/compressing etc. of the voice data in accordance with the CODEC method (CODEC type) contained in the control information given from the CA 2. The CODEC unit 113, when the voice source data are transferred to the voice source data storage buffer 116 from the voice source data transfer unit 112, encodes the voice source data corresponding to the CODEC type, and packetizes the encoded voice source data with a predetermined packet translation period (e.g., 20 ms). The thus-packetized voice source data are transmitted as IP packets to the packet processing unit 114. The IP packet transmitted at that time involves using, e.g., an RTP (Real-time Transport Protocol)/RTCP (RTP Control Protocol) packet, wherein a predetermined port number for transferring the voice source data may be set in a UDP (User Datagram Protocol) header field. The packet processing unit 114 can know that the received packet is the voice source data transfer packet, by referring to this port number.

Conversely, with respect to the voice packet transferred from the packet processing unit 114, the CODEC unit 113 decodes the voice data contained in the voice packet in accordance with the CODEC type which the packet processing unit 114 notifies of, thus effecting conversion into STM digital signals. The CODEC unit 113 adds the voice source data thus-converted to STM digital signals onto a target STM channel.

Packet Processing Unit 114

The packet processing unit 114 receives the voice source data packet packetized by the CODEC unit 113, or the VOIP packet transmitted from the IP switch unit 117, and executes a variety of processes corresponding to the received packets. When receiving the voice source data packet from the CODEC unit 113, the packet processing unit 114 stores the received voice source data packet on the voice source data storage buffer 116. Further, the packet processing unit 114 controls the transmission of the voice source data packet stored on the voice source data storage buffer 116 by the instruction of the control unit 110.

FIG. 4 is a diagram showing a detailed functional configuration of the packet processing unit of the VOIPGW in the first embodiment. The detailed functional configuration of the packet processing unit 114 will be explained with reference to FIG. 4. The packet processing unit 114 actualizes the packet processing by use of, in addition, a receiving unit 141, a transmitting unit 142, a local bus control unit 143, a voice source data transmission control unit 144, a voice source data storage control unit 145, a voice source data storage information table 147 and a voice source data transmission management table 146. These function units will be described as follows.

Receiving Unit 141, Transmitting Unit 142

The receiving unit 141 receives the IP packet, and the transmitting unit 142 transmits the IP packet. The receiving unit 141 receives the IP packet transmitted from the IP switch unit 117 and the IP packet transmitted from the CODEC unit 113. The received IP packets are transferred to the packet processing unit 114. The transmitting unit 142 transmits the predetermined IP packet to the IP switch unit 117 or the CODEC unit 113.

Local Bus Control Unit 143

The local bus control unit 143 performs the control for notifying the respective function units in order to execute the packet processing based on the instruction given from the control unit 110.

Voice Source Data Transmission Control Unit 144

The voice source data transmission control unit 144, based on a voice source data add instruction given from the CA 2 (the local bus control unit 143), refers to the voice source data storage information table 147, and notifies the packet processing unit 114 of various items of information (a storage address etc.) about the designated voice source data. Upon the notification from the voice source data transmission control unit 144, the packet processing unit 114 reads the designated voice source data packet from the voice source data storage buffer 116. The packet processing unit 114, which has read the voice source data packet, updates a destination of this voice source data packet into an address indicating the CODEC unit 113, further updates the UDP port number into a port number indicating a transmission destination subscriber, and transmits the packet toward the CODEC unit 113. The control unit 110 previously notifies of the port number indicating the transmission destination subscriber terminal.

Voice Source Data Storage Control Unit 145

The packet processing unit 114, based on a voice source data storage starting instruction given from the CA 2 (the local bus control unit), when judging from the port number of the received IP packet that this IP packet is a packet for transferring the voice source data, stores the voice source data packet on the voice source data storage buffer 116. The voice source data storage control unit 145 receives information about storing the voice source data from the packet processing unit 114, and stores the information in the voice source data storage information table 147. Note that the packet processing unit 114 may continue to store the received packet on the voice source data storage buffer 116 till a voice source data storage finishing instruction comes from the local bus control unit 143.

Voice Source Data Transmission Management Table 146

The voice source data transmission management table 146 manages management information of the voice source data packet stored on the voice source data storage buffer 116 on a destination-by-destination basis of the voice source data transmission. The voice source data transmission management table 146 has, on the destination-by-destination basis, has pieces of information about a port number, a message number, header information, directional information, a next transmission voice source data packet buffer address and a timer. The port number is an ID assigned to every transmission destination subscriber terminal and is set as a UDP port number. The message number is an ID determined for every voice message and is the same as the information stored in the voice source data storage information table 147. The header information is information used for updating the header when transmitting the voice source data packet. The directional information is information indicating a transmitting direction (toward PSTN/IP network) of the voice source data packet. The next transmission voice source data packet buffer address is information representing a storage address of the data that should be transmitted next in the case of sequentially sending the voice source data packets. The timer has setting of a packet transmission interval period determined based on the voice-packetization, and is employed for taking a timing when sending the next packet.

Voice Source Data Storage Information Table 147

The voice source data storage information table 147 is a table stored with, on a voice-source-data-by-voice-source-data basis (e.g., a guidance message), pieces of information about the voice source data packet stored on the voice source data storage buffer 116. The voice source data storage information table 147 is stored with, on the voice-source-data-by-voice-source-data basis, pieces of information such as a message number, a CODEC type, a start buffer address, a last buffer address, a chain count and an in-use count. The message number is an ID determined for every voice message, and the CA 2 gives an instruction to send the predetermined voice source data by use of this message number. The CODEC type is a type of the CODEC for the voice source data. The start buffer address, the last buffer address and the chain count are information representing addresses where the voice source data are stored on the voice source data storage buffer 116, and, if stored in division, the number of divisions (the chain count). The in-use count is information showing whether or not the voice source data are being transmitted at the present, wherein the in-use count may be, for example, counted up each time the voice source data are transmitted and may also be cleared (becomes "0") if there is no partner destination to which the data are being transmitted.

Packet Buffer 115

The packet buffer 115 is a memory area used when transmitting and receiving the VOIP packets.

Voice Source Data Storage Buffer 116

The voice source data storage buffer 116 is a memory area provided in the packet buffer 115 and serving to store the voice source data packets. The voice source data are stored in a state of being packetized by the CODEC unit 113. Note that a storage mode may be direct storage of the voice source data packet given the header etc. or may also be storage of only the voice source data in the packet.

IP Switch Unit 117

The IP switch unit 117 becomes an interface with the IP network 3.

Example of Operation

Figure 5:
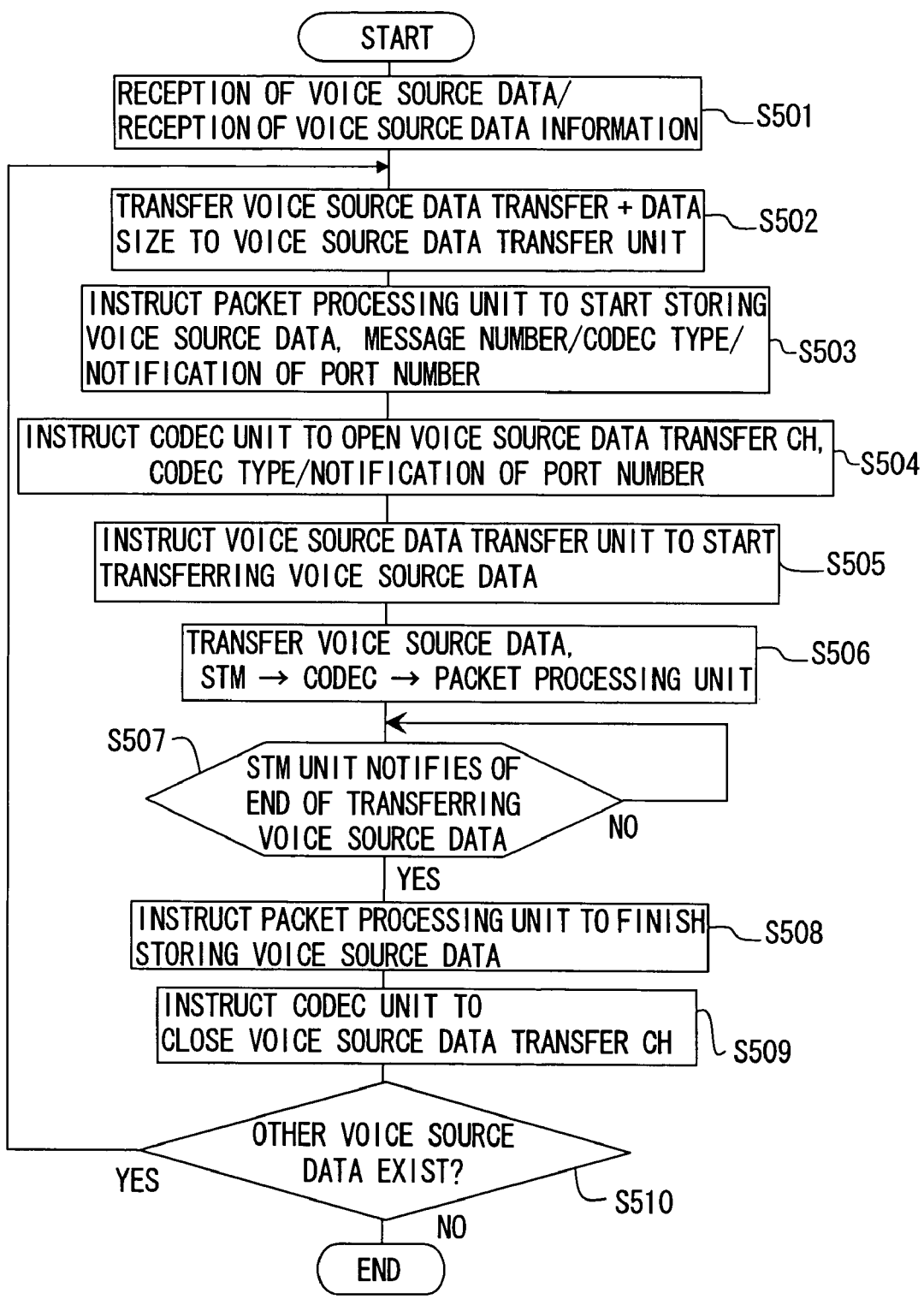
FIG. 5 is a diagram showing a flowchart showing a voice source data storage process of the VOIPGW in the first embodiment.
Figure 6:
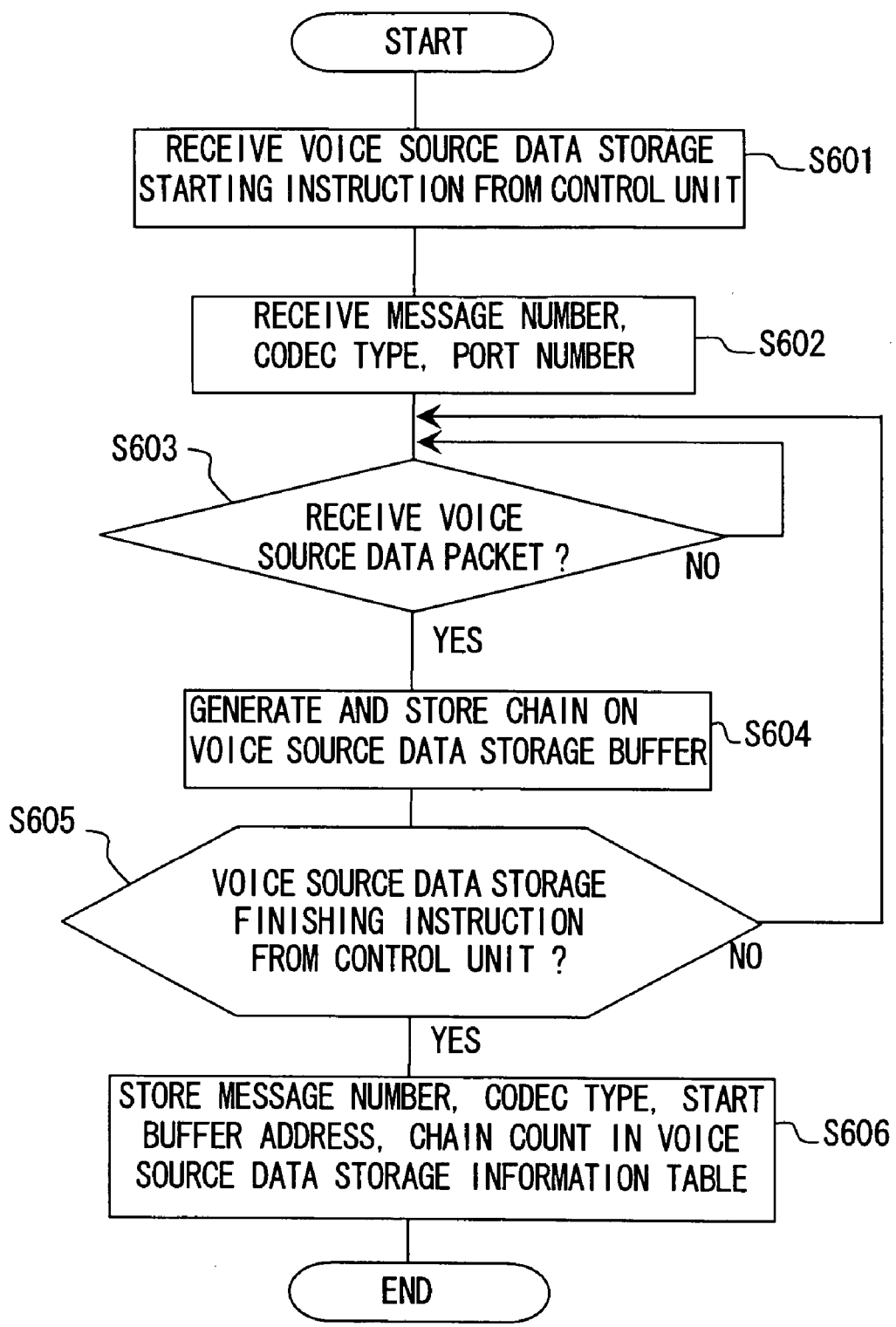
FIG. 6 is a diagram showing a flowchart showing the voice source data storage process in the packet processing unit in the first embodiment.
Figure 7:
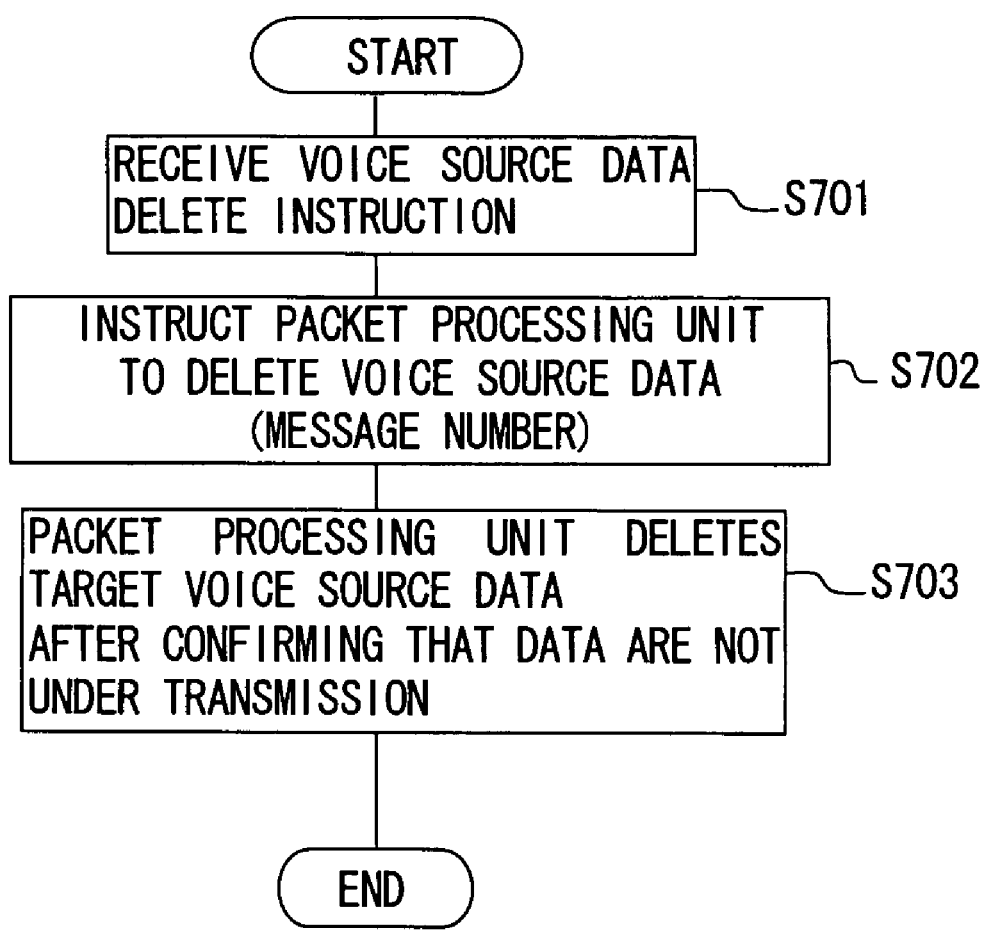
FIG. 7 is a diagram showing a flowchart showing a voice source data delete process of the VOIPGW in the first embodiment.

Next, an example of the operation of the VOIP gateway device in the first embodiment will be described with reference to FIGS. 5 through 7. Herein, the operation of the VOIP gateway device is explained in separation into a case of storing the voice source data transferred from the FTP server 1 on the voice source data storage buffer 116, a case of deleting the stored voice source data, and a case of sending the stored voice source data to the PSTN. The following discussion will exemplify the VOIPGW 11 shown in FIG. 1, wherein an assumption is a case that the VOIPGW 11 sends the voice message to the telephone 15.

Voice Source Data Storage Process

To begin with, an operation of the VOIPGW 11 in the case of storing the voice source data storage buffer 116 with the voice source data transferred from the FTP server 1, will be described with reference to FIG. 5. FIG. 5 is a flowchart showing voice source data storing procedure of the VOIPGW in the first embodiment.

The VOIPGW 11, when storing the voice source data, receives the voice source data and the voice source data information from the FTP server 1 connected to the IP network 3 (S501). These pieces of information are transmitted as, e.g., FTP packets from the IP network 3 and are therefore received by the control unit 110 via the IP switch unit 117 and the packet processing unit 114. The voice source data information in the packet contains a message number showing a voice message serving as a source of the voice source data, a data size of the voice source data, a CODEC type, an STM channel information for transferring the voice source data, a UDP port number, etc.

The control unit 110, which has received the voice source data and the voice source data information, transmits the voice source data and the data size to the voice source data transfer unit 112 (S502). With this operation, the voice source data transfer unit 112 stores the voice source data temporary memory 133 with the received voice source data by the notified data size. Then, the control unit 110 notifies the packet processing unit 114 of the message number of the should-be-transferred voice source data, the CODEC type and the port number, and also notifies the packet processing unit 114 of a voice source data storage starting instruction (S503).

Subsequently, the control unit 110 notifies the CODEC unit 113 of the CODEC type and the port number, and instructs the CODEC unit 113 to open the voice source data transfer channel (S504). Following this instruction, the CODEC unit 113 opens the voice source data transfer channel, and prepares for acquiring the voice source data that will be transferred. Then, when acquiring the voice source data, the CODEC unit 113 encodes the voice source data, corresponding to the notified CODEC type, thus voice-packetizing the voice source data. The CODEC unit 113, when effecting this voice-packetization, translates the notified port number into a UDP port number and transmits the UDP port number to the packet processing unit 114.

The control unit 110 instructs the voice source data transfer unit 112 to start transferring the voice source data (S505). Based on this voice source data transfer starting instruction, the voice source data are relayed sequentially to the STM switch control unit 111 and the CODEC unit 113 and thus transferred to the packet processing unit 114 (S506). Thereafter, the control unit 110 waits till receipt of a transfer end notification informing of an end of transferring the voice source data from the voice source data transfer unit 112 (S507, S507; No). Upon receiving the transfer end notification (S507; YES), the control unit 110 instructs the packet processing unit 114 to finish storing the voice source data (S508). The control unit 110 further instructs the CODEC unit 113 to close the voice source data transfer channel (S509). With this operation, the VOIPGW 11 terminates the voice source data transfer process (S510; NO). Note that if there exist other voice source data (S510; YES), the transfer process is continuously executed (S502).

An operation of the packet processing unit 114 with respect to such a voice source data storage process will hereinafter be explained with reference to FIG. 6. FIG. 6 is a flowchart showing the voice source data storage process in the packet processing unit 114.

The packet processing unit 114, when receiving a voice source data storage starting instruction from the control unit 110 (S601), executes the following voice source data storage process. The packet processing unit 114, following the instruction, receives a message number of the should-be-transferred voice source data, a CODEC type and a port number from the control unit 110 (S602). With this receipt, the packet processing unit 114, for a start of storing the voice source data, waits for an IP packet in which the notified port number is set, i.e., the voice source data packet (S603, S603; NO).

Upon receiving the IP packet containing the port number set therein, the packet processing unit 114 judges that this packet is the voice source data packet, and stores this packet on the voice source data storage buffer 116 (S604). At this time, a single voice message is received in a segmented state into a plurality of voice source data packets, and hence the packet processing unit 114 stores the voice source data packets in a way that generates a chain for every packet.

As the storage of the voice source data is ended, the packet processing unit 114 judges whether or not the voice source data storage finishing instruction is received from the control unit 110 (S605), and, if not received (S605; NO), the packet processing unit 114 comes again to the waiting state for receiving the voice source data packet (S603). Namely, the packet processing unit 114 continues the voice source data storage process till the receipt of the voice source data storage finishing instruction from the control unit 110. When receiving the storage finishing instruction from the control unit 110, the packet processing unit 114 recognizes an end of the should-be-stored voice source data, and stores various items of information about the stored voice source data in the voice source data storage information table 147 (S606).

Voice Source Data Delete Process

Next, an operation of the VOIPGW 11 in the case of deleting the stored voice source data will be described with reference to FIG. 7. FIG. 7 is a flowchart showing a voice source data delete process of the VOIPGW 11 in the first embodiment.

The control unit 110 of the VOIPGW 11, when deleting the voice source data, receives a voice source data delete instruction from the CA 2 (S701). Notification of this instruction is given through a control packet, wherein a should-be-deleted message number is contained in this control packet. The control unit 110 receiving this instruction designates the should-be-deleted message number and instructs the packet processing unit 114 to delete the voice source data (S702). The packet processing unit 114, upon receiving this instruction, confirms that the voice source data corresponding to the designated message number is not in the process of its transmission, and, if not so, deletes the same voice source data (S703).

Figure 8:
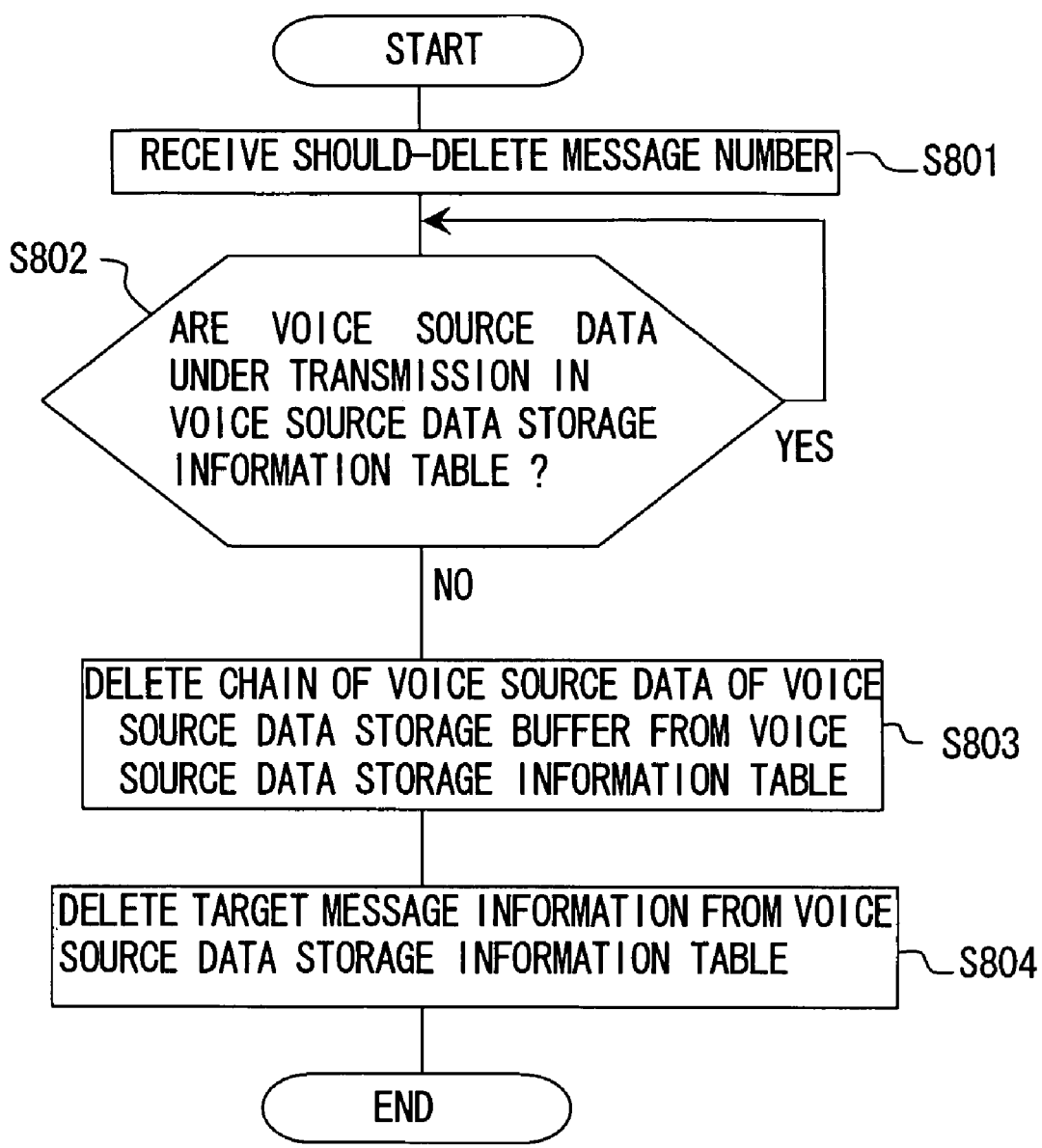
FIG. 8 is a diagram showing a flowchart showing the voice source data delete process in the packet processing unit in the first embodiment.

An operation of the packet processing unit 114 with respect to such a voice source data delete process will be described as below with reference to FIG. 8. FIG. 8 is a flowchart showing the voice source data delete process in the packet processing unit 114.

The packet processing unit 114, when receiving the should-be-deleted message number and the voice source data delete instruction from the control unit 110 (S801), executes the following voice source data delete process. The packet processing unit 114, based on the instruction, judges whether or not the voice source data corresponding to the designated message number are under the transmission, by referring to an in-use count in the voice source data storage information table 147 (S802). When judging from the in-use count that the target voice source data are not in use (S802), the packet processing unit 114 refers to the start buffer address, the last buffer address, the chain count, etc., of the voice source data storage information table 147 and thus deletes the chain of the voice source data stored in the voice source data storage buffer 116 (S803). With this operation, it follows that the designated voice source data are deleted from the voice source data storage buffer 116. Finally, the packet processing unit 114 deletes all the information about the deleted voice source data from the voice source data storage information table (S804).

Voice Source Data Transmission Process

Figure 9:
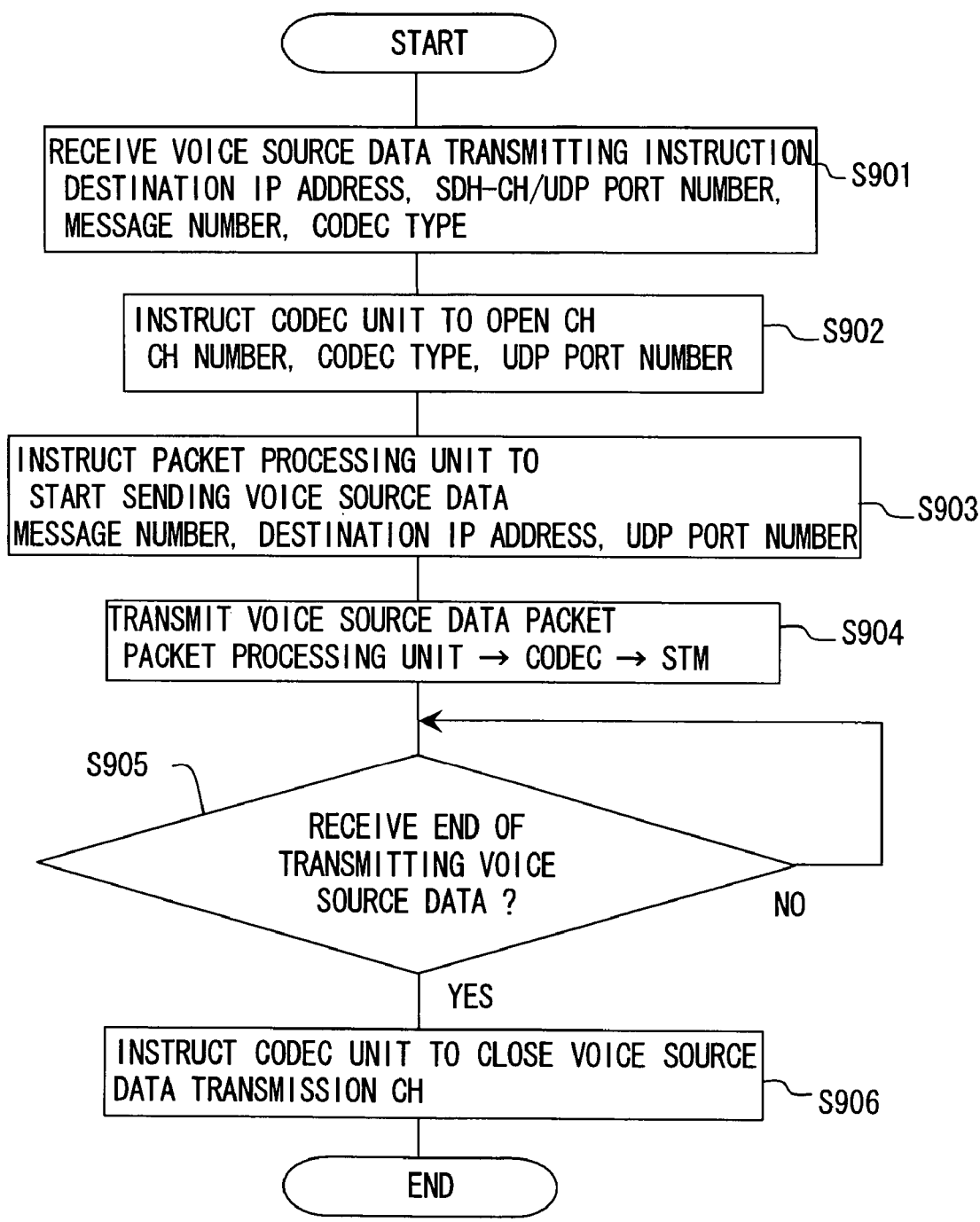
FIG. 9 is a diagram showing a flowchart showing a voice source data transmission process of the VOIPGW in the first embodiment.

Next, an operation of the VOIPGW 11 in the case of sending the stored voice source data to the PSTN will be explained with reference to FIG. 9. FIG. 9 is a flowchart showing the voice source data transmission process of the VOIPGW in the first embodiment.

The control unit 110 of the VOIPGW 11, when sending the voice source data, receives a voice source data transmission instruction from the CA 2 (S901). This voice source data transmission instruction contains pieces of information such as a destination IP address, a channel number/UDP port number, a message number, a CODEC number, etc. An address of the CODEC unit 113 that should transmit the voice source data packet in the case of transmitting the voice source data to the PSTN is set to the destination IP address field. Then an IP address of the partner destination user terminal to which the voice source data should be transmitted in the case of transmitting the voice source data toward the IP network is designated to the destination IP address field. If the partner destination user terminal is the H323 terminal 6 shown in FIG. 1, an IP address of the H323 terminal 6 is designated. A channel number/UDP port number associated with the call of the transmission destination user terminal is designated in the channel number/UDP port number field.

The control unit 110, upon receiving the instruction, notifies the CODEC unit 113 of a channel number associated with the transmission destination user terminal, a CODEC type for decoding the voice source data packet transmitted from the packet processing unit 114 and a UDP port number associated with the call of the transmission destination user terminal, and instructs the CODEC unit 113 to open the designated channel (S902).

Subsequently, the control unit 110 notifies the packet processing unit 114 of the designated message number, the destination IP address and the UDP port number, and instructs the packet processing unit 114 to start transmitting the voice source data (S903). The packet processing unit 114 receiving the transmission starting instruction reads the voice source data packet associated with the designated message number from the voice source data storage buffer 116, updates the UDP port number in this voice source data packet into the designated UDP port number, and transmits the voice source data packet to the CODEC unit 113 specified by the destination IP address (S904).

The control unit 110 waits till receipt of transmission end notification informing of an end of the voice source data transmission from the CA 2 (S905, S905; NO). When receiving the transmission end notification (S905; YES), the control unit 110 instructs the CODEC unit 113 to close the channel corresponding to the transmission destination user terminal (S906).

Figure 10:
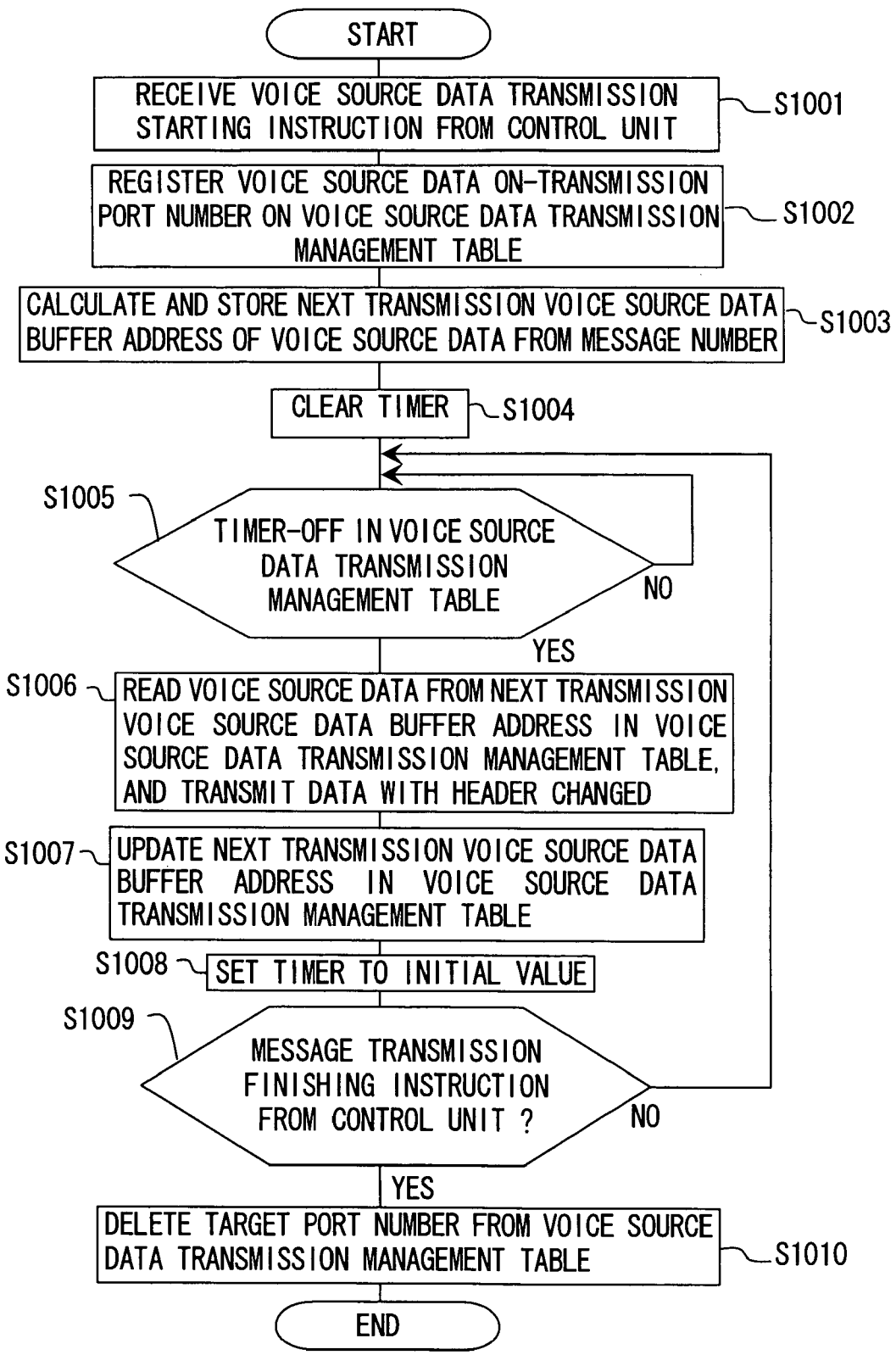
FIG. 10 is a diagram showing a flowchart showing the voice source data transmission process in the packet processing unit in the first embodiment.

An operation of the packet processing unit 114 with respect to such a voice source data transmission process will be described as below with reference to FIG. 10. FIG. 10 is a flowchart showing the voice source data transmission process in the packet processing unit 114.

The packet processing unit 114, when receiving a voice source data transmission starting instruction from the control unit 110 (S1001), executes the following voice source data transmission process. The packet processing unit 114, based on the instruction, registers information about the target voice source data in the voice source data transmission management table 146 (S1002, S1003, S1004). The port number specifying the transmission destination user terminal that is set in the UDP header of the to-be-transmitted packet (S1002) and the address in the voice source data storage buffer 116 stored with the voice source data that should be transmitted next time (S1003), are registered as the information about the voice source data, and the timer value is cleared (S1004).

The packet processing unit 114 judges whether the timer in the voice source data transmission management table is cleared or not (S1005). If the timer is judged to be cleared (S1005; YES), the voice source data packet is read from the voice source data storage buffer 116 on the basis of the address set in the next transmission voice source data buffer address field in the voice source data transmission management table (S1006). The packet processing unit 114 updates the destination IP address, the UDP port number, etc. of the readout voice source data packet, and sends the updated packet to the CODEC unit 113 (S1006). The packet processing unit 114, for registering the address where the voice source data packet, which should be transmitted when reading next, are stored, updates the next transmission voice source data buffer address in the voice source data transmission management table (S1007). Further, the packet processing unit 114 resets the timer in the voice source data transmission management table 146 to a packet transmission period as the initial value (S1008).

The packet processing unit 114, upon finishing the process, judges whether or not the voice source data transmission finishing instruction comes from the control unit 110 (S1009). If the voice source data transmission finishing instruction comes in (S1009; YES), the packet processing unit 114 deletes a record containing the port number specifying the user terminal becoming the transmission destination this time is entered in the port number field in the voice source data transmission management table (S1010). Whereas if the voice source data transmission finishing instruction does not come from the control unit 114 (S1009; NO), the packet processing unit 114 continues the voice source data transmission process (S1005). The packet processing unit 114 continues the voice source data transmission process till the voice source data transmission finishing instruction comes from the control unit 110, in other words, till the call of the transmission destination user terminal is disconnected or otherwise and till the CA 2 judges that the transmission of the voice message to its transmission destination is ended.

Operations/Effects in First Embodiment

Figure 11:
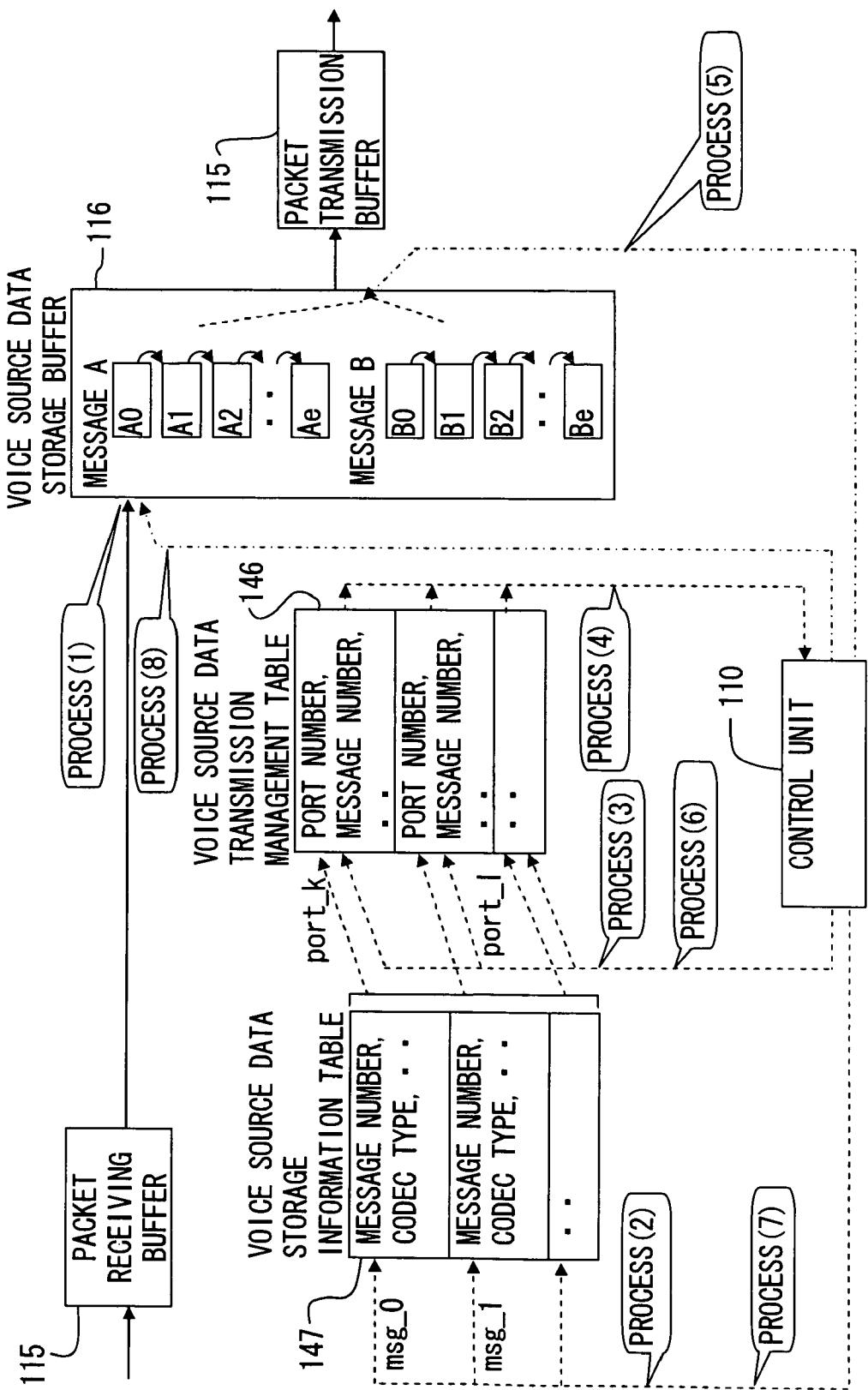
FIG. 11 is a diagram showing a diagram showing an outline of voice source data storage/delete/transmission processes.

Herein, operations and effects of the VOIP gateway device in the first embodiment discussed above, will be described. FIG. 11 is a diagram showing an outline of control flows of the respective function units with respect to the voice source data storage process, the voice source data delete process and the voice source data transmission process of the VOIPGW 11. The description of the operation might involve referring to FIG. 11 as the necessity arises.

In the VOIPGW 11 in the first embodiment, on the occasion of providing the guidance message of a talkie etc. to each telephone as the subscriber terminal, at first, the guidance message is digitized, and the packetized voice source data packets are stored on the voice source data storage buffer 116.

In this voice source data storage process, the VOIPGW 11 receives the voice source data retained on the FTP server 1, and temporarily stores the received voice source data on the voice source data transfer unit 112. Thereafter, in the VOIPGW 11, the CODEC unit 113 packetizes the voice source data during a period till a voice source data storage finishing instruction is received since a voice source data storage starting instruction was received from the CA 2, and the voice source data storage buffer 116 is sequentially stored with the packetized voice source data packets (a process (1) shown in FIG. 11).

The VOIPGW 11, upon receiving the voice source data storage finishing instruction given from the CA 2, registers the stored information about the voice source data packet stored this time in the voice source data storage information table 147, wherein the message number as the voice message ID is used as a key (a process (2) shown in FIG. 11).

Thus, the VOIP gateway device in the first embodiment digitizes and packetizes the voice message provided to the subscriber terminal such as the telephone etc., and stores the voice source data packet on the voice source data storage buffer in the packet buffer. With this operation, the VOIP gateway device in the first embodiment has no necessity of adding any memory dedicated to the voice source data to within the device, and part of the buffer within the memory that is normally employed for the packet processing is efficiently used, thus enabling the voice source data to be retained. Further, the CODEC unit 113, when assembling the voice source data packet, effects the voice-compression, whereby a data capacity itself of the should-be-stored voice source data can be reduced, and, by the same token, the memory capacity for storing the voice source data can be saved.

The VOIPGW 11, when actually providing the voice message service, sequentially reads the voice source data packets stored beforehand on the voice source data storage buffer 116 and transmits the voice source data packets in accordance with the voice source data transmission starting instruction given from the CA 2. When reading the voice source data, the VOIPGW 11 assigns the predetermined port number to every transmission destination and registers the voice source data transmission information in the voice source data transmission management table 146 (a process (3) shown in FIG. 11). Further, as the voice source data are packetized and thus stored, the packet transmission timing is managed by the timer in the voice source data transmission management table 146, and the stored voice source data packet is transmitted with the period set in the timer (processes (4) and (5) shown in FIG. 11). The VOIPGW 11 deletes the record concerning the target partner destination terminal registered previously in the voice source data transmission management table 146 in accordance with the voice source data transmission finishing instruction (a process (6) shown in FIG. 11).

Thus, the VOIP gateway device in the first embodiment handles, on the packet basis, the voice source data that are packetized and thus retained on the occasion of transmitting the voice source data. With this scheme, in a case such as building up the voice source data storage buffer by use of DRAM (Dynamic Random Access Memory), the high-speed memory accessing can be attained by employing a burst access function of the DRAM, and, by the same token, it is possible to increase the number of voice source data simultaneous transmission channels.

Figure 12:
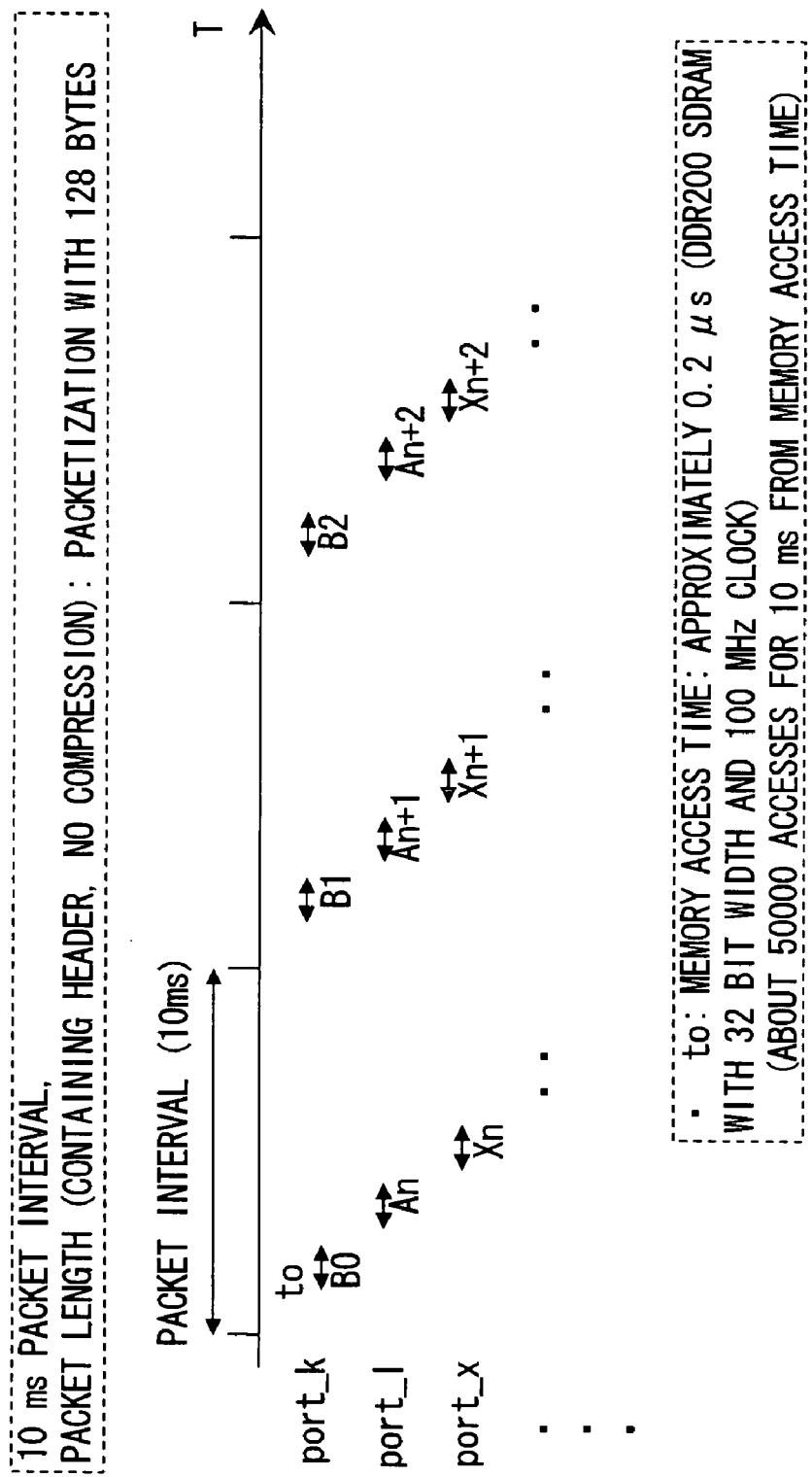
FIG. 12 is a diagram showing a diagram showing an example of a buffer memory access in the voice source data transmission process.

In this respect, FIG. 12 shows a result of examination made by exemplifying such a case that the voice source data storage buffer involves adopting SDRAM (Synchronous DRAM) (32-bit width, 100 mega-Hertz (MHz) memory clock) of DDR (Double Data Rate) 200. The reason why the effect with respect to the simultaneous transmission channel count in the first embodiment is obtained, will be elucidated with reference to FIG. 12. In the example shown in FIG. 12, there is given a case in which a voice source data packet transmission interval is set to 10 millisecond (ms), and a voice source data packet length is set to 128 bytes. In the SDRAM in this example, the memory access time is approximately 0.2 microsecond (μs) in terms of specifications thereof, and hence a memory accessible count with one-packet period (10 ms) is considered to be approximately 50,000. Accordingly, simply the simultaneous accessing can be done for 50,000 channels at the maximum. Hence, as compared with the voice source data adding in the general type of STM switch control unit, the simultaneous accessible channel count can be remarkably increased.

The VOIPGW 11, when receiving the voice source data delete instruction from the CA 2, extracts the storage information about the delete target voice source data from the voice source data storage information table 147, and deletes the target voice source data from the voice source data storage buffer 116 on the basis of the extracted storage information (processes (7) and (8) shown in FIG. 11).

Thus, in the VOIP gateway device in the first embodiment, the voice source data management can be conducted as the buffer management. This management mode facilitates, on such an occasion as to add, delete and change the voice message, managing the target voice source data, and enables obviation of troublesomeness of the memory management in the conventional system.

Second Embodiment

A VOIP gateway device in a second embodiment of the present invention will hereinafter be described. The VOIP gateway device according to the first embodiment discussed earlier receives the should-be-transmitted voice source data from the FTP server and stores the voice source data. The VOIP gateway device in the second embodiment has a function of transferring the voice source data to other VOIP gateway device (which will hereinafter be referred to as an other-device transfer function). The network architecture shall be the same as that in the first embodiment shown in FIG. 1. A configuration of the second embodiment that will hereinafter be described is an exemplification, and the present invention is not limited to the following configuration.

Configuration of Device

Figure 13:
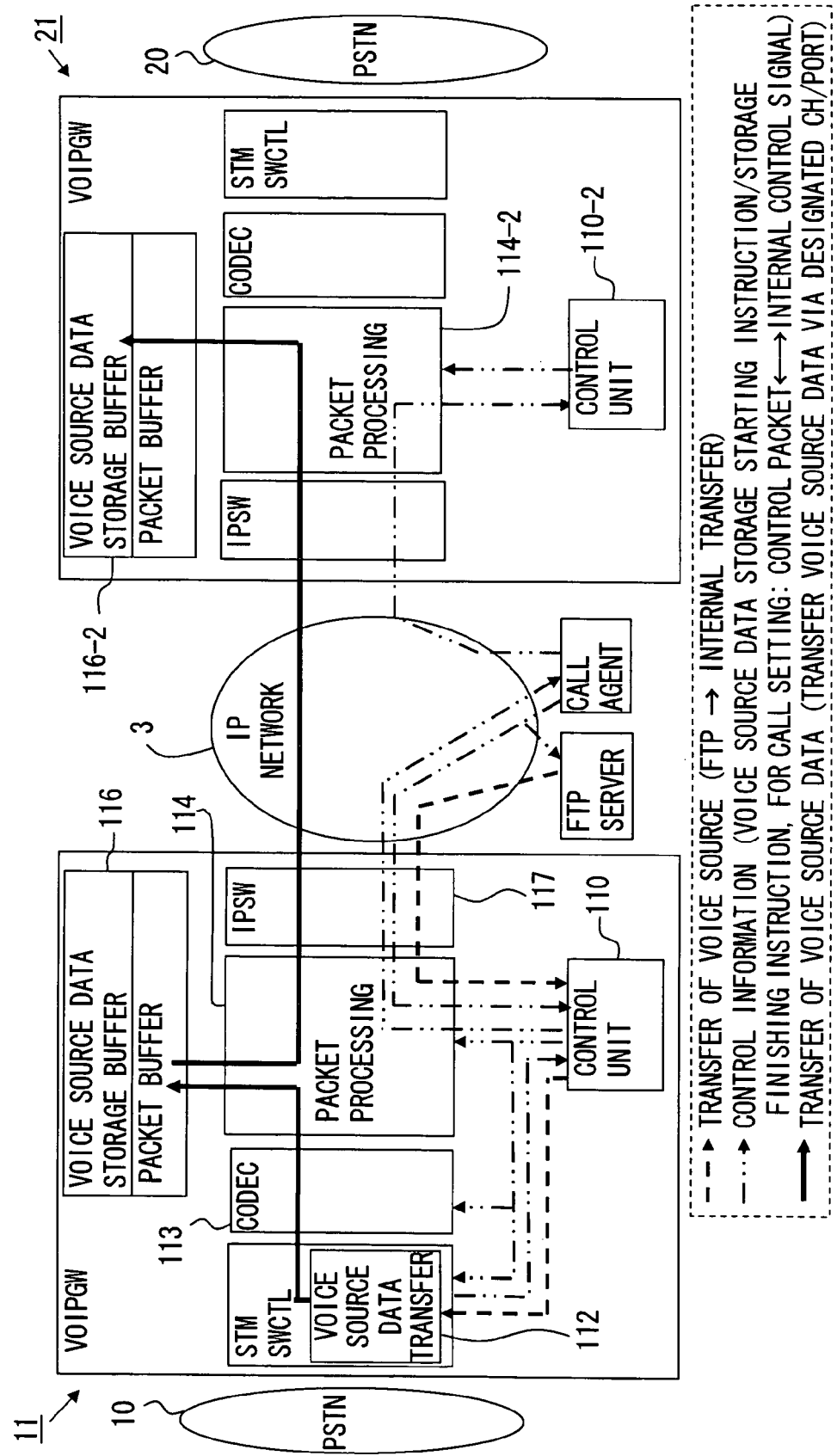
FIG. 13 is a diagram showing a diagram showing a configuration of the VOIPGW and a control flow in a second embodiment.

The VOIP gateway device according to the second embodiment is constructed of the same function units as those in the first embodiment, however, the operations of the respective function units are somewhat different. The function units operating differently from the first embodiment will be explained with reference to FIG. 13. FIG. 13 is a diagram showing functional configurations of VOIPGWs 11, 21 and a control flow in the second embodiment, and showing the control flow in the case of transferring the voice source data packet from the VOIPGW 11 to the VOIPGW 21. Further, in the following discussion, the explanations of the same function units as those in the first embodiment are omitted.

Control Unit 110

The control unit 110 of the transmission-side VOIPGW 11, when executing the other-device transfer, as in the first embodiment, receives the call setting for transferring the voice source data and the voice source data transfer instruction from the CA 2. This voice source data transfer instruction contains pieces of information such as the message number, the CODEC type, the channel number, the port number and a destination IP address, wherein a different point from the first embodiment is to contain the destination IP address. This destination IP address is employed by the packet processing unit 114, and an address of the other transfer destination VOIP gateway device (VOIPGW 21) is designated as the destination IP address. Other pieces of information are the same as those in the first embodiment.

The control unit 110, upon receiving the voice source data transfer instruction, notifies the packet processing unit 114 of the port number specifying the voice source data packet and the destination IP address associated with this port number (2-dotted chain lines shown in FIG. 13). The notification given to other function units is the same as in the case of transferring voice source data in the first embodiment.

Moreover, a control unit 110-2 of the receiving-side VOIPGW 21 receives the call setting for transferring the voice source data and the voice source data storage instruction from the CA 2. This voice source data storage instruction contains pieces of information such as the message number of the voice source data packet that is transferred to this side, the CODEC type and the port number. Based on this voice source data storage instruction, the control unit 110-2 controls the respective function units.

Packet Processing Unit 114

The packet processing unit 114 (corresponding to a transfer unit according to the present invention) has the following function in addition to that in the first embodiment. The transmitting-side packet processing unit 114, when receiving the voice source data packet transmitted from the CODEC unit 113, updates the destination IP address of voice source data packet with the destination IP address which the control unit 110 has notified of, and sends the address-updated packet to the IP switch unit 117. With this operation, it follows that the IP switch unit 117 transmits the packet toward the IP network 3, and the packet is forwarded to the VOIPGW 21. Note that the packet processing unit 114, other than sending the voice source data packet toward the IP network 3, may store the voice source data storage buffer 116 with the voice source data packet as in the first embodiment.

A receiving-side packet processing unit 114-2, upon receiving the packet having setting of the port number which the control unit 110-2 has notified of, judges this packet as the voice source data packet, and stores the packet on a self voice source data storage buffer 116-2.

Example of Operation

Figure 14B:
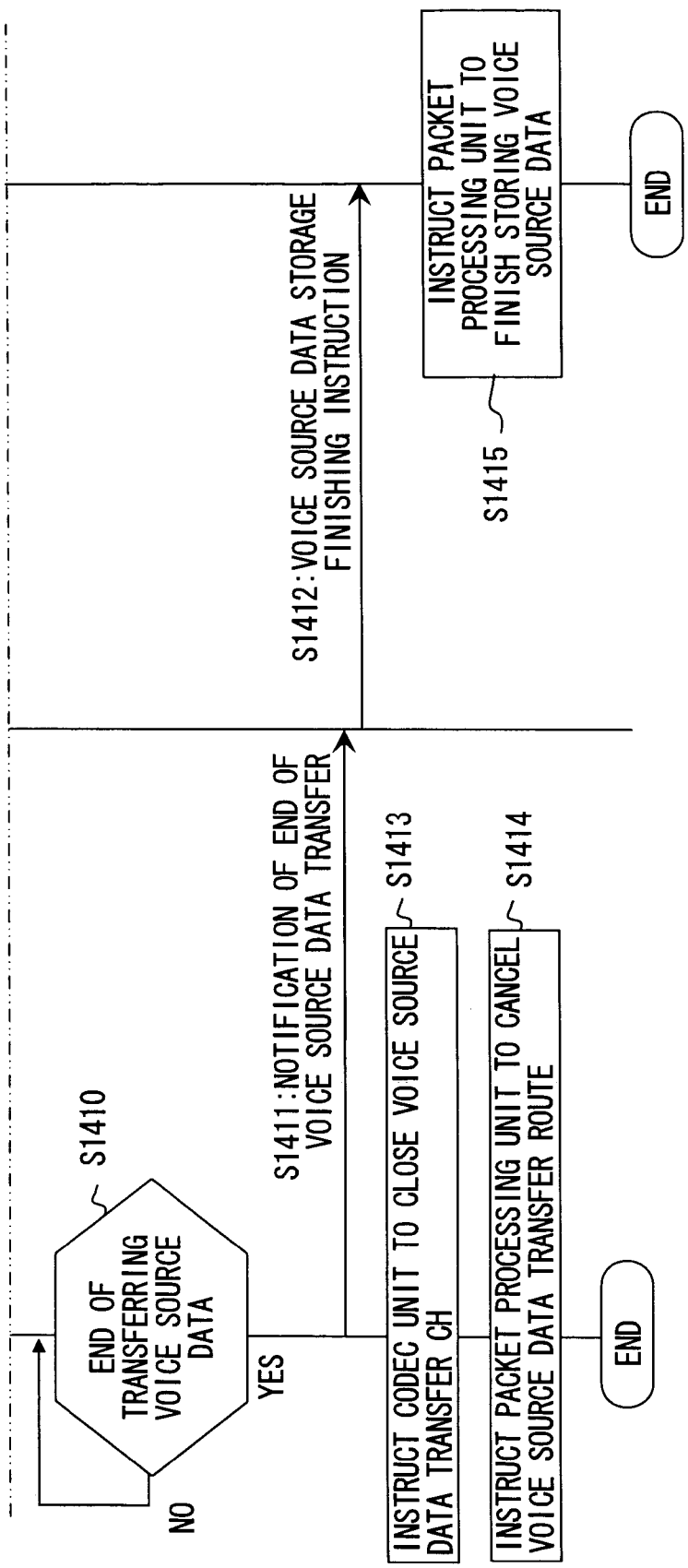

Next, an example of the operation of the VOIP gateway device in the second embodiment will be described with reference to FIGS. 14A and 14B. FIGS. 14A and 14B are diagrams showing a sequence of the other-device transfer process in the second embodiment.

Other-Device Transfer of Voice Source Data

For actualizing the other-device transfer of the voice source data, the VOIPGW needs being stored with the voice source data. Such being the case, to begin with, the FTP server 1 transmits the voice source data to the transmitting-side VOIPGW 11 (S1401). When finishing the transfer, the CA 2 sends a control packet containing the voice source data storage instruction to the receiving-side VOIPGW 21 (S1402), and subsequently transmits the voice source data transfer instruction to the transmitting-side VOIPGW 11 (S1403). The voice source data storage instruction and the voice source data transfer instruction contain a call setting instruction for transferring the voice source data and voice source data transfer information. The voice source data transfer information to the VOIPGW 21 contains a message number about the voice source data that are transferred to this side, a CODEC type and a port number. The voice source data transfer information to the VOIPGW 11 contains a message number about the voice source data that should be transferred, a CODEC type, a channel number, a port number and a destination IP address.

The VOIPGW 11 receiving the voice source data and the voice source data transfer instruction executes the same process as the voice source data storage process in the first embodiment. The VOIPGW 11 temporarily stores the voice source data on the voice source data transfer unit 112 (S1404). Thereafter, the VOIPGW 11 instructs the CODEC unit 113 and the packet processing unit 114 to transfer the voice source data as preparation for transferring the voice source data (S1405, S1406). The packet processing unit 114 is notified of the port number specifying the voice source data packet, the destination IP address of the transfer destination, etc. (S1405). The CODEC unit 113 is notified of the CODEC type and the port number together with an instruction to open the voice source data transfer channel (S1406).

When sending the voice source data transfer starting instruction to the voice source data transfer unit 112 from the VOIPGW 11 (S1407), the transfer of the voice source data is started (S1409). The voice source data are transferred to the CODEC unit 113 via the designated channel of the STM, and, after being voice-packetized (into the voice source data packet) by the CODEC unit 113, transferred to the packet processing unit 114. The packet processing unit 114 changes the transmission destination IP address of the voice source data packet that has been transferred to this side into the pre-notified destination IP address, whereby the packet is forwarded toward the IP network 3.

On the other hand, the receiving-side VOIPGW 21, based on the voice source data storage instruction (S1402), gives the voice source data storage instruction to a packet processing unit 114-2 (S1408). This instruction contains pieces of information (the message number, the CODEC type and the port number) about the voice source data that are transferred to this side. With this operation, the VOIPGW 21 comes to a voice source data packet transfer waiting state, wherein the VOIPGW 21 stores a self voice source data storage buffer 116-2 with the voice source data packet each time the packet having setting of the notified port number reaches.

The transmitting-side VOIPGW 11 continues to transfer the voice source data till the transfer of the voice source data is completed (S1410, S1410; NO), and, when finishing transferring all the voice source data (S1410; YES), notifies of an end of the voice source data transfer (S1411). Upon notifying of the end of the voice source data transfer, the VOIPGW 11, as a voice source data transfer finishing process, instructs the CODEC unit 113 to close the voice source data transfer channel (S1413) and instructs the packet processing unit 114 to cancel a voice source data transfer route (S1414).

The receiving-side VOIPGW 21 waits for the voice source data storage finishing instruction from CA 2 (S1412), then instructs the packet processing unit 114-2 to finish storing the voice source data at a point of time when receiving this instruction (S1415), and finishes the voice source data storage process.

Operation/Effects in Second Embodiment

In the second embodiment, the VOIPGW 11 packetizes the voice source data temporarily stored on the voice source data transfer unit 112 provided in the self STM switch control unit, and transfers the packet to the other VOIPGW 21. On the other hand, the VOIPGW 21 receiving the transferred voice source data packet stores this voice source data packet on the self voice source data storage buffer 116-2.

With this operation, in the second embodiment, the number of the gateway devices provided in the STM switch control unit and each having the voice source data transfer function can be limited. As a matter of course, the multi-function device becomes expensive, and therefore, in the system employing the VOIP gateway device, the system can be configured in a way that restrains the costs.

Third Embodiment

The following is a description of a VOIP gateway device according to a third embodiment of the present invention. The VOIP gateway device according to the second embodiment discussed earlier has the function of transferring the voice source data transferred from the FTP server to the other gateway device from the voice source data transfer unit provided in the STM switch control unit. The VOIP gateway device according to the third embodiment has a function of transferring the voice source data packet stored on the self voice source data storage buffer to the other gateway device (which will hereinafter referred to as an inter-buffer transfer function). The network architecture shall be the same as that in the first embodiment shown in FIG. 1. A configuration of the third embodiment that will hereinafter be described is an exemplification, and the invention is not limited to the following configuration.

Configuration of Device

Figure 15:
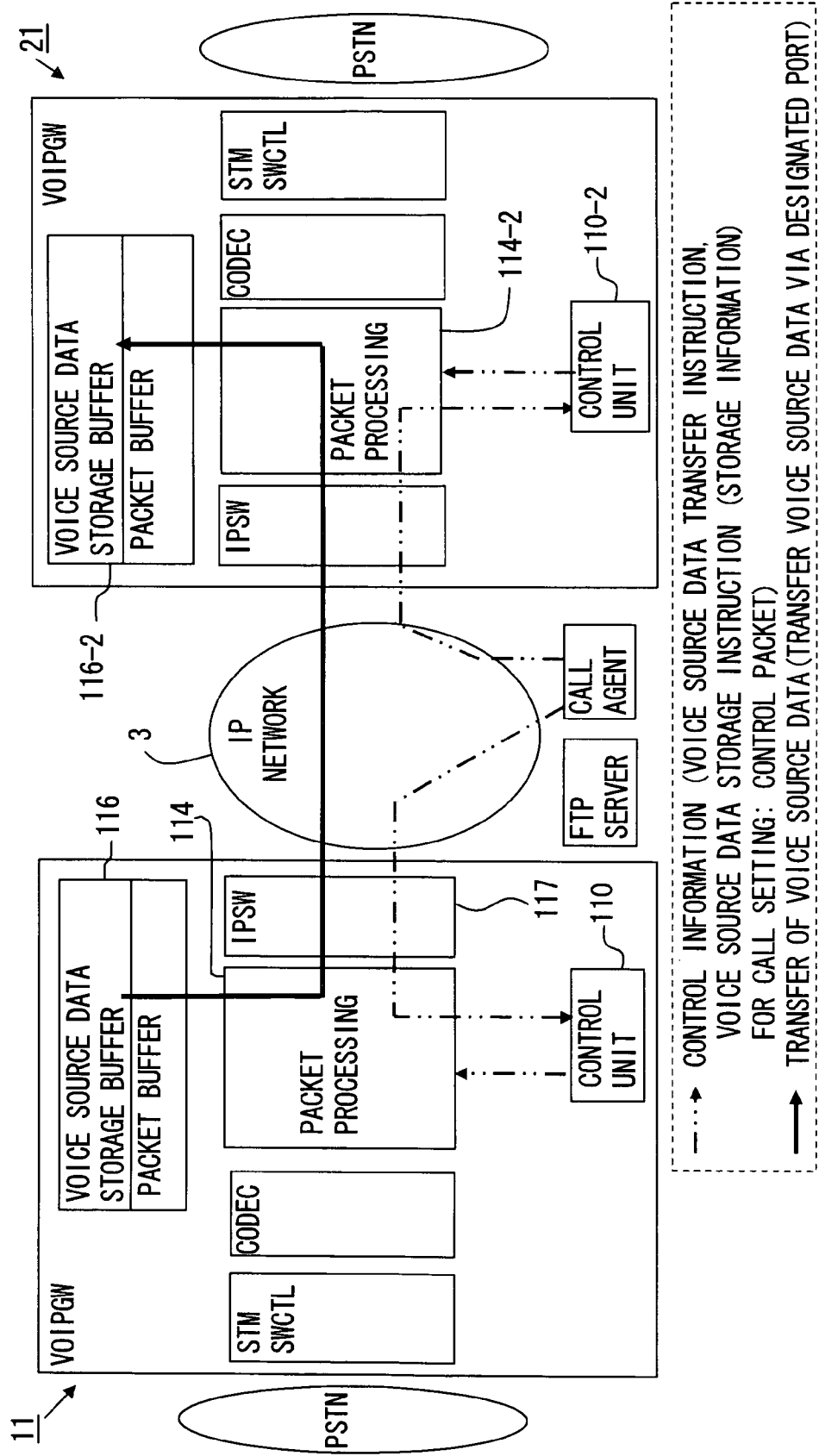
FIG. 15 is a diagram showing a diagram showing a configuration of the VOIPGW and a control flow in a third embodiment.

The VOIP gateway device according to the third embodiment is constructed of the same function units as those in the first embodiment, however, the operations of the respective function units are somewhat different. The function units operating differently from the first embodiment will be explained with reference to FIG. 15. FIG. 15 is a diagram showing functional configurations of the VOIPGWs 11, 21 and a control flow in the third embodiment, and showing the control flow when the voice source data packet stored on the VOIPGW 11 is forwarded to the VOIPGW 21. Further, in the following discussion, the explanations of the same function units as those in the first embodiment are omitted.

Control Units 110/110-2

The control unit 110 on the transmitting-side VOIPGW 11, for actualizing the inter-buffer transfer function, receives an already-stored voice source data transfer instruction from CA 2. This transfer instruction contains pieces of information such as a message number, a port number, a destination IP address, etc. The destination IP address is employed by the packet processing unit 114, and an address of the other VOIP gateway device (VOIPGW 21) as the transfer destination is entered in this destination IP address field. The control unit 110, based on this transfer instruction, controls the packet processing unit 114.

On the other hand, the control unit 110-2 on the receiving-side VOIPGW 21 receives the voice source data storage instruction from the CA 2. This storage instruction contains pieces of information such as a message number, a port number, etc. The control unit 110-2 controls the packet processing unit 114-2 on the basis of this storage instruction.

Packet Processing Unit 114

The packet processing unit (corresponding to a data transmitting unit according to the present invention) has the following function in addition to the function in the first embodiment. The transmitting-side packet processing unit 114, when receiving the already-stored voice source data transfer instruction from the control unit 110, reads the voice source data packet associated with the designated message number from the voice source data storage buffer 116. The packet processing unit 114 updates the port number and the transmission destination IP address in the readout voice source data packet into the designated port number and designated destination IP address. Note that on the occasion of transferring this voice source data packet, the packet processing unit 114 may add a predetermined packet header for the inter-buffer transfer function to the readout voice source data packet. The packet processing unit 114 forwards the updated voice source data packet not as the voice packet (taking account of the packet transmission period etc.) but as a normal data packet to the IP switch unit 117 (toward the IP network 3). Note that the packet processing unit 114 may also forward the packet by the FTP transfer in which this voice source data packet is handled as the data (datagram).

Example of Operation

Figure 16:
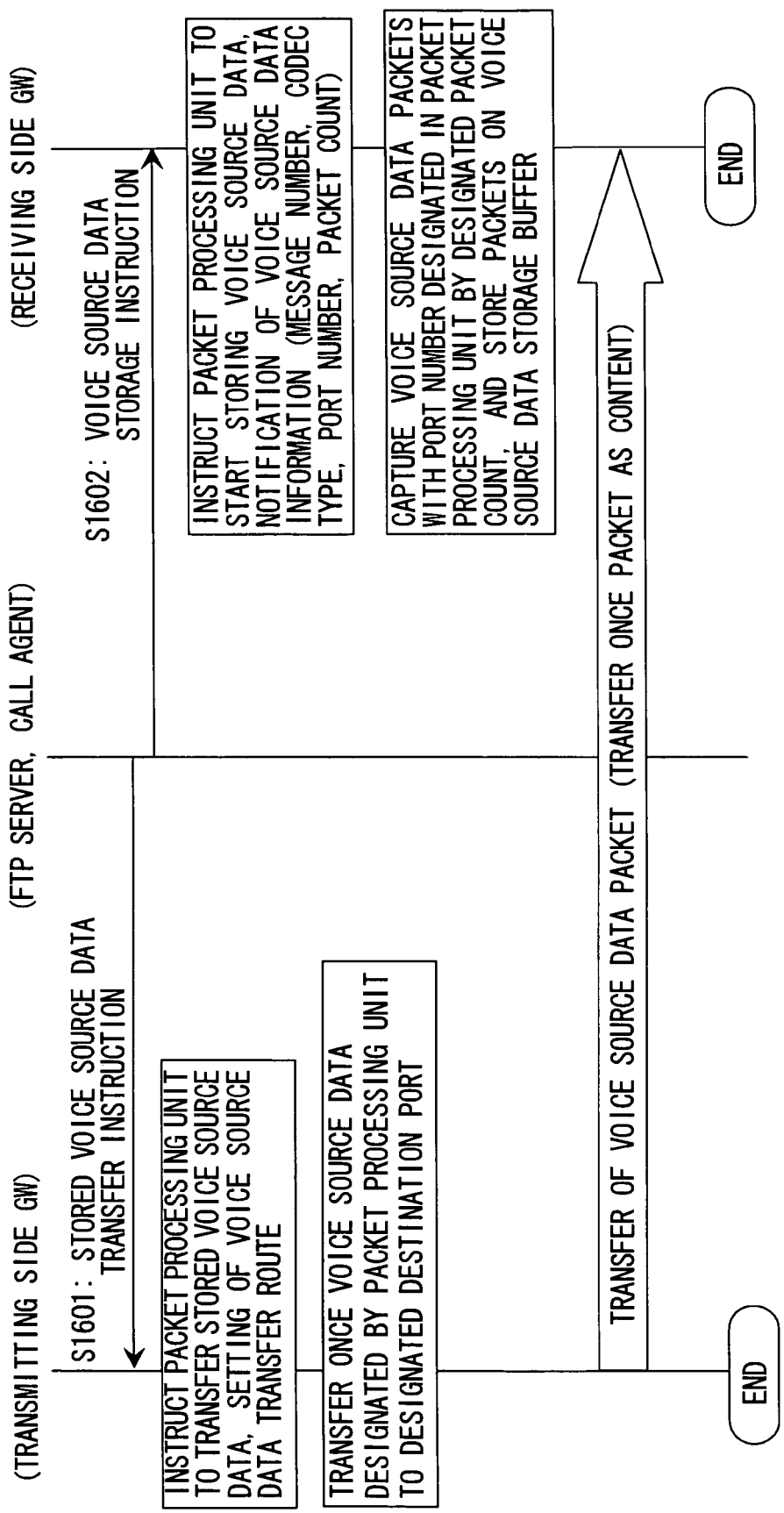
FIG. 16 is a diagram showing a diagram showing an inter-buffer transfer process sequence of the VOIPGW in the third embodiment.
Figure 17:
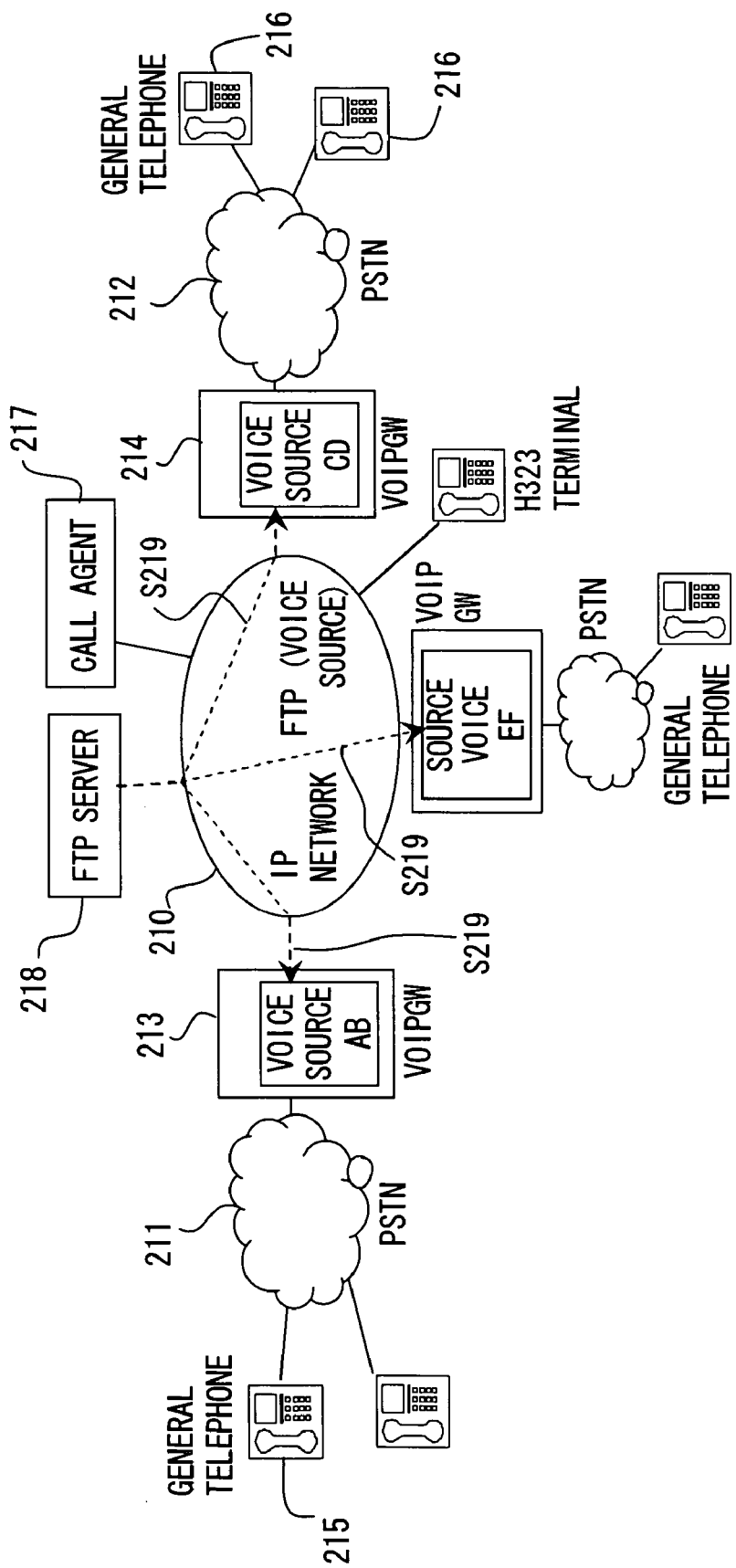
FIG. 17 is a diagram showing a diagram showing a network architecture in a conventional system.
Figure 18:
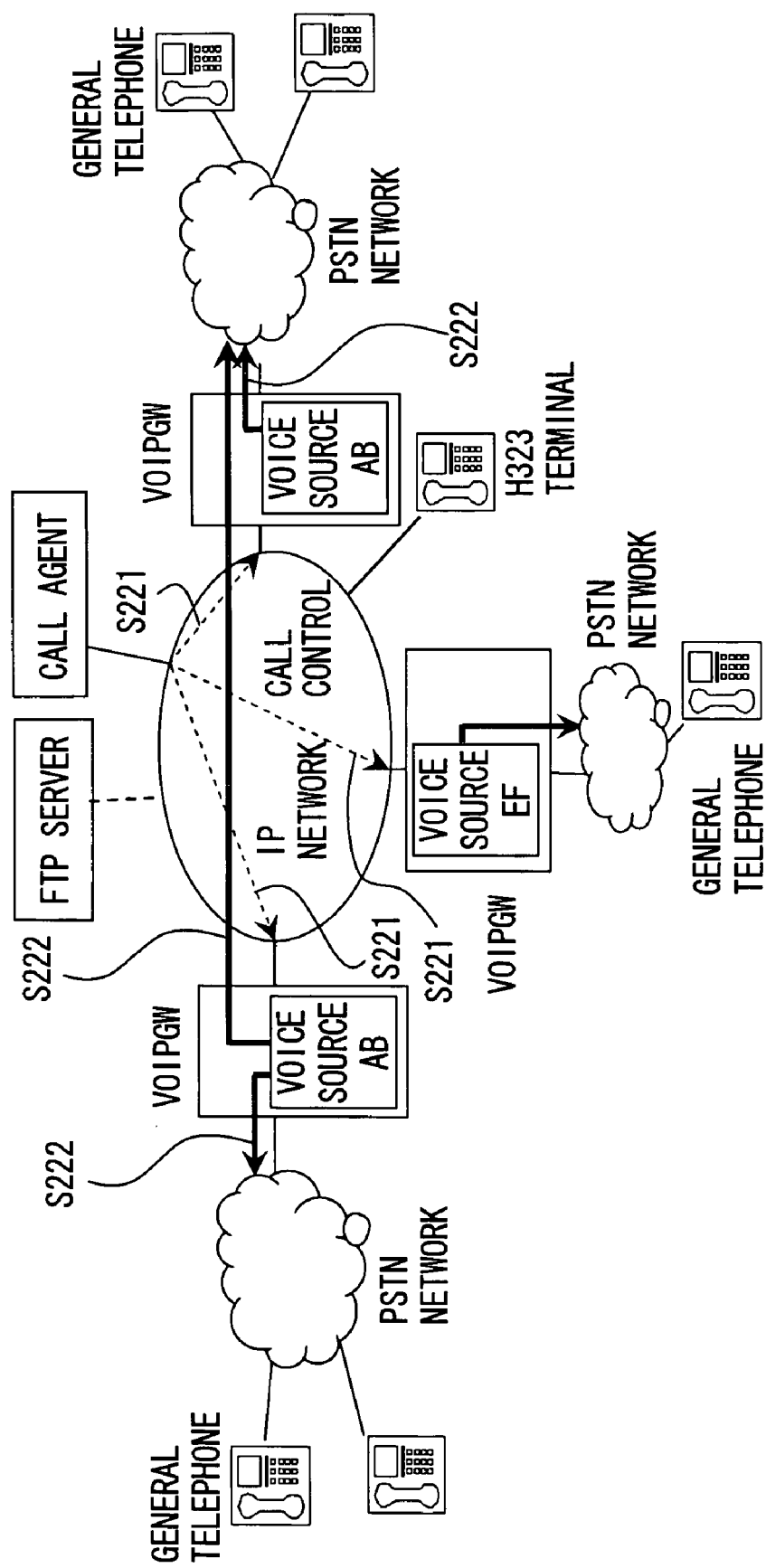
FIG. 18 is a diagram showing a diagram showing call setting/voice source data transmission to VOIPGW in the conventional system.
Figure 19:
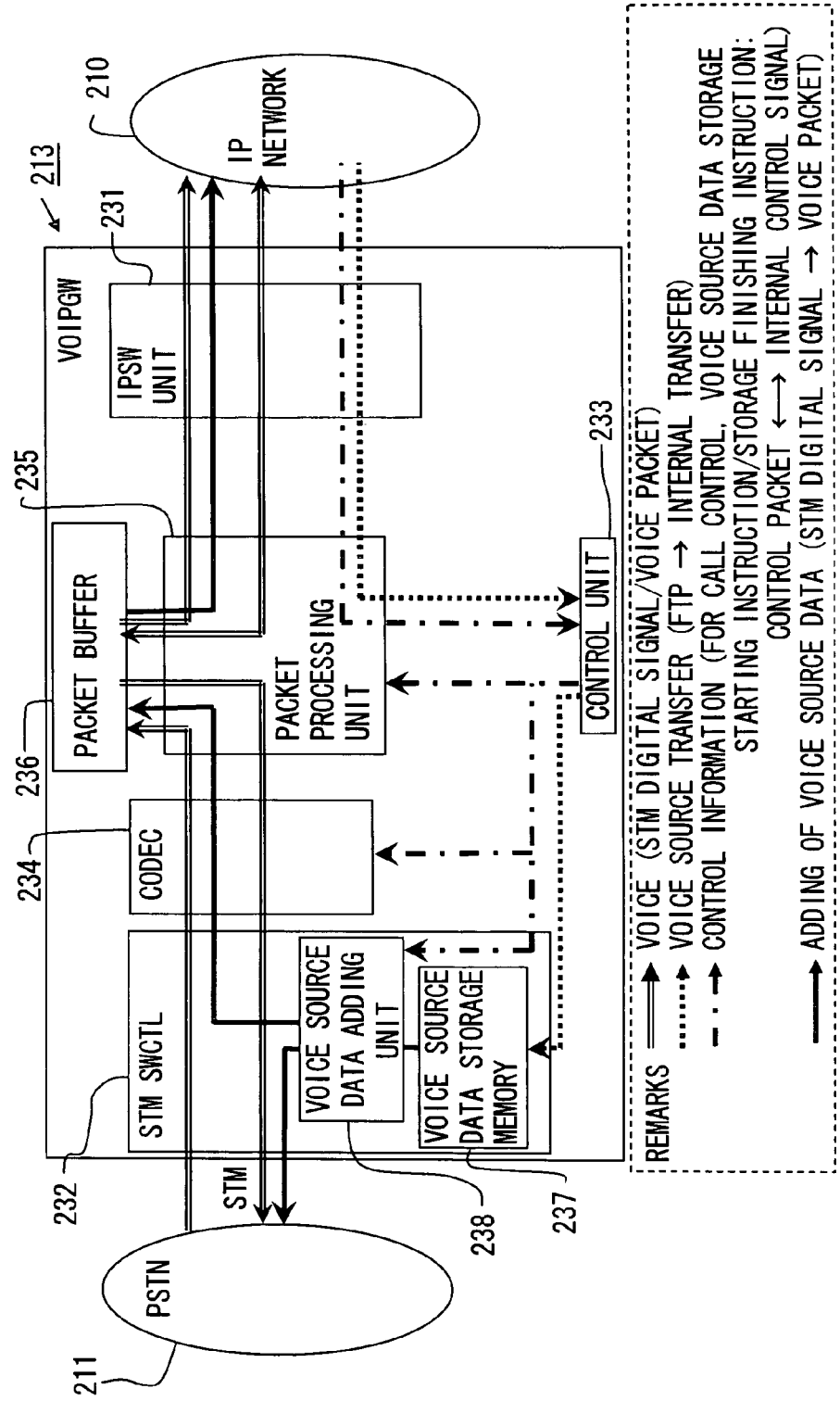
FIG. 19 is a diagram showing a configuration of a VOIPGW and a control flow in the conventional system.

Next, an example of the operation of the VOIP gateway device in the third embodiment will be explained with reference to FIG. 16. FIG. 16 is a diagram showing a sequence of the inter-buffer transfer process of the VOIPGW in the third embodiment.

Inter-Buffer Transfer

Actualization of the inter-buffer transfer of the voice source data requires storing the voice source data on the VOIPGW, however, the voice source data storage process thereof is the same as that in the first embodiment. The following operation is an operation conducted in such a state that the voice source data packet is already stored on the voice source data storage buffer 116 of the VOIPGW 11.

The CA 2 sends the already-stored voice source data transfer instruction to the transmitting-side VOIPGW 11 (S1601). This already-stored voice source data transfer instruction contains pieces of information such as a port number, a message number, a destination IP address, a call setting instruction for the transfer, etc., which are used for transferring the voice source data packet. Subsequently, the CA 2 sends the voice source data storage instruction to the receiving-side VOIPGW 21 (S1602). This voice source data storage instruction contains a message number, a port number, a CODEC type and a packet count. Herein, the packet count represents the number of the voice source data packets that are transferred to this side.

The VOIPGW 11 receiving the already-stored voice source data transfer instruction notifies the packet processing unit 114 of the already-stored voice source data transfer instruction (S1603). The packet processing unit 114, when receiving this instruction, transfers all the voice source data packets corresponding to the designated voice message as the data packets to the designated destination (S1604).

On the other hand, the VOIPGW 21 receiving the storage instruction instructs the packet processing unit 114-2 to start storing the voice source data (S1605), and receives the transferred data packets by the notified packet count. The transferred data packet is identified with the packet associated with the voice source data packet from the port number and is stored on the message storage buffer 116-2 (S1606).

Operation/Effects in Third Embodiment

In the third embodiment, the VOIPGW 11 transfers the voice source data packet stored on the self voice source data storage buffer 116 as the normal data packet to the other VOIPGW 21. On the other hand, the VOIPGW 21 receiving the transferred data packet stores the voice source data packet contained in the data packet on the self voice source data storage buffer 116-2.

With this operation, in the third embodiment, the voice source data can be handled and transferred in the same way as the normal data can be without transmitting the data with the predetermined period etc. as in the case of the voice packet. This makes it possible to copy the voice source data held by one device to the plurality of devices by the simple method.

Others

The disclosures of Japanese patent application No.JP2005-079630, filed on Mar. 18, 2005 including the specification, drawings and abstract are incorporated herein by reference.

What is claimed is:

1. A relay device located at a boundary between an existing telephone network and an IP network, relaying a voice signal and an IP packet in a way that mutually converts the voice signal transferred and received over the existing telephone network and the IP packet transferred and received over the IP network, the relay device comprising:

a receiving unit receiving voice source data into which a voice message is digitized;

a packet processing unit converting the received voice source data into a voice source data packet as the IP packet;

a storage unit storing the voice source data packets; and a transmitting unit transmitting, when transmitting a designated voice message to a designated destination, the voice source data packet corresponding to the designated voice message among the stored voice source data packets to the designated destination further comprising a retaining unit retaining, with respect to a on-transmission voice source data packet, for every on-transmission destination, a message management number of the voice message according to the on-transmission voice source data packet, a transmission interval timer and destination information for the on-transmission voice source data packet, wherein the transmitting unit transmits the same voice messages from the head of the voice messages respectively to a plurality of destinations by referring to or updating information retained by the retaining unit.

2. A relay method relaying a voice signal and an IP packet in a way that mutually converts the voice signal transferred and received over an existing telephone network and the IP packet transferred and received over an IP network, the relay method comprising:

a receiving step of receiving voice source data into which a voice message is digitized;

a converting step of converting the received voice source data into a voice source data packet as the IP packet;

a storing step of storing the voice source data packets;

a transmitting step of transmitting, when transmitting a designated voice message to a designated destination, the voice source data packet corresponding to the designated voice message among the stored voice source data packets to the designated destination; and a retaining step of retaining, with respect to an on-transmission voice source data packet, for every on-transmission destination, a message management number of the voice message according to the on-transmission voice source data packet, a transmission interval timer and destination information for the on-transmission voice source data packet, wherein the transmitting step transmits the same voice messages from the head of the voice messages respectively to a plurality of designations by referring to or updating information retained by the retaining step.

3. A relay device including a CODEC unit receiving a voice signal from a subscriber terminal via a STM channel control unit and generating a voice packet by encoding the received voice signal and a packet processing unit transmitting the voice packet generated by the CODEC unit toward IP network, the relay device comprising:

a receiving unit receiving voice source data into which a voice guidance message is digitized and voice source data information which includes a CODEC type, STM channel information and a UDP port number regarding the voice source data;

a control unit controlling the STM channel control unit so as to transmit the voice source data received by the receiving unit to the CODEC unit on a STM channel designated by the STM channel information included in the voice source data information about the voice source data and controlling the CODEC unit so as to generate the voice source data packet, in which the UDP port number included in the voice source data information about the voice source data is set, by encoding the voice source data received by the STM channel according to the CODEC type included in the voice source data information about the voice source data;

a storing unit storing the voice source data packet which is identified from packets transmitted from the CODEC unit based on the UPD port number being set in the packets; and a transmitting unit transmitting, when transmitting a designated voice guidance message to a designated destination, the voice source data packet corresponding to the designated voice guidance message among the voice source data packets stored by the storing unit to the designated destination.

4. A relay method receiving a voice signal from a subscriber terminal and generating a voice packet by encoding the received voice signal and transmitting the voice packet generated, the method comprising the steps of:

receiving voice source data into which a voice guidance message is digitized and voice source data information which includes a CODEC type, STM channel information and a UDP port number regarding the voice source data;

controlling an STM channel so as to transmit the voice source data received by a receiving unit to a CODEC unit on an STM channel designated by the STM channel information included in the voice source data information about the voice source data and controlling the CODEC unit so as to generate a voice source data packet, in which the UDP port number included in the voice source data information about the voice source data is set, by encoding the voice source data received by the STM channel according to the CODEC type included in the voice source data information about the voice source data;

storing the voice source data packet which is identified from packets transmitted from the CODEC unit based on the UPD port number being set in the packets; and transmitting, when transmitting a designated voice guidance message to a designated destination, the voice source data packet corresponding to the designated voice guidance message among the voice source data packets stored by the storing unit to the designated destination.

* * * * *

UNITED STATES PATENT AND TRADEMARK OFFICE
CERTIFICATE OF CORRECTION

PATENT NO. : 7,359,374 B2  Page 1 of 1
APPLICATION NO. : 11/174836
DATED : April 15, 2008
INVENTOR(S) : Hideo Abe et al.

It is certified that error appears in the above-identified patent and that said Letters Patent is hereby corrected as shown below:

Column 23, line 34: "...UPD..." should be changed to -- ...UDP... --

Column 24, line 28: "...UPD..." should be changed to -- ...UDP... --

Signed and Sealed this

Nineteenth Day of August, 2008

JON W. DUDAS
*Director of the United States Patent and Trademark Office*